US012669626B2

(12) United States Patent
Chen et al.

(10) Patent No.: US 12,669,626 B2
(45) Date of Patent: Jun. 30, 2026

(54) METHOD AND APPARATUS OF DISTRIBUTED ACOUSTIC SENSING

(71) Applicant: EXFO Inc., Quebec (CA)

(72) Inventors: Hongxin Chen, Montreal (CA); Michel Leblanc, Quebec (CA); Michel Leclerc, Quebec (CA)

(73) Assignee: EXFO Inc., Quebec (CA)

( * ) Notice: Subject to any disclaimer, the term of this patent is extended or adjusted under 35 U.S.C. 154(b) by 230 days.

(21) Appl. No.: 18/329,133

(22) Filed: Jun. 5, 2023

(65) Prior Publication Data

US 2024/0012167 A1 Jan. 11, 2024

Related U.S. Application Data

(60) Provisional application No. 63/486,786, filed on Feb. 24, 2023, provisional application No. 63/486,797, (Continued)

(51) Int. Cl.
*G01V 1/22* (2006.01)
*G01V 1/00* (2006.01)

(52) U.S. Cl.
CPC .............. *G01V 1/226* (2013.01); *G01V 1/001* (2013.01)

(58) Field of Classification Search
CPC ......... G01V 1/001; G01V 1/226; G01H 9/004
See application file for complete search history.

(56) References Cited

U.S. PATENT DOCUMENTS 5,194,847 A 3/1993 Taylor et al.
6,778,720 B1 8/2004 Cekorich et al.
(Continued)

FOREIGN PATENT DOCUMENTS

CA 2946279 C * 11/2018 ............. G01V 1/226
CN 115452191 A 12/2022
(Continued)

OTHER PUBLICATIONS

Sascha Liehr et al., Wavelength-scanning coherent OTDR for dynamic high strain resolution sensing, Optics Express, vol. 26 Issue 8, pp. 10573-10588 (2018), Retrieved from the Internet: < URL: https://opg.optica.org/directpdfaccess/7fb23c10-c287-4a22-b56c1068f708c829_385526/oe-26-8-10573.pdf?da=1&id=385526 &seq=0&mobile=no> <DOI:10.1364/OE.26.010573>. >.
Mengmeng Chen, Ali Masoudi, and Gilberto Brambilla, "Performance analysis of distributed optical fiber acoustic sensors based on φ-OTDR," Optics Express vol. 27, Issue 7, pp. 9684-9695 (2019), <https://doi.org/10.1364/OE.27.009684>.
(Continued)

*Primary Examiner* — John Fitzgerald
(74) *Attorney, Agent, or Firm* — Helene Chotard

(57) ABSTRACT

There is provided a method and an apparatus of fiber optic distributed acoustic sensing (DAS) which can use low-cost coherent laser as well as low-cost acquisition and processing electronics and which can still provide reliable monitoring results for optical fiber monitoring and troubleshooting applications in optical fiber telecommunication networks. Such low-cost solution is made possible by employing grouped data signal processing. Data is processed over independent groups of data to provide an independent DAS signal for each group. This allows measurements to be less sensitive to laser fluctuations and thereby reduces coherent laser technical specification requirements and allows the use of a low-cost coherent laser (thereby reducing the cost of the laser) as well as low-cost acquisition and processing electronics.

13 Claims, 16 Drawing Sheets

Related U.S. Application Data filed on Feb. 24, 2023, provisional application No. 63/367,673, filed on Jul. 5, 2022, provisional application No. 63/367,689, filed on Jul. 5, 2022.

(56)                    References Cited

U.S. PATENT DOCUMENTS

| | | | |
|---|---|---|---|
| 7,920,253 | B2 | 4/2011 | Cyr et al. |
| 7,957,436 | B2 | 6/2011 | Chen et al. |
| 8,923,663 | B2 | 12/2014 | Hill et al. |
| 9,170,149 | B2 * | 10/2015 | Hartog .................. G01M 11/083 |
| 9,228,890 | B2 | 1/2016 | Omichi et al. |
| 9,476,760 | B2 | 10/2016 | Brady et al. |
| 9,641,243 | B2 | 5/2017 | Perron |
| 10,048,115 | B2 | 8/2018 | Farhadiroushan et al. |
| 10,345,138 | B2 * | 7/2019 | Milione .................. G01H 9/004 |
| 10,393,572 | B2 | 8/2019 | Farhadiroushan et al. |
| 10,429,234 | B2 * | 10/2019 | Nishiguchi ............ G01H 9/002 |
| 10,697,824 | B2 * | 6/2020 | Cedilnik ................ G01H 9/004 |
| 11,169,019 | B2 * | 11/2021 | Chen ........................ G01L 1/246 |
| 11,237,025 | B2 * | 2/2022 | Issa .......................... G01H 9/004 |
| 11,698,288 | B2 | 7/2023 | Hveding et al. |
| 11,815,373 | B2 * | 11/2023 | Issa ..................... G01D 5/35361 |
| 11,976,552 | B2 | 5/2024 | Skinner et al. |
| 12,326,533 | B2 | 6/2025 | Li et al. |
| 2012/0177174 | A1 | 7/2012 | Ikhlef et al. |
| 2012/0280117 | A1 | 11/2012 | Lewis et al. |
| 2013/0319121 | A1 | 12/2013 | Hill et al. |
| 2016/0169712 | A1 | 6/2016 | Farhadiroushan et al. |
| 2017/0082484 | A1 | 3/2017 | Farhadiroushan et al. |
| 2017/0149496 | A1 | 5/2017 | Perron et al. |
| 2020/0393290 | A1 * | 12/2020 | Chen ...................... G01H 9/004 |
| 2021/0140814 | A1 | 5/2021 | Aktas et al. |
| 2021/0356776 | A1 | 11/2021 | Ip et al. |
| 2021/0359755 | A1 | 11/2021 | Rochat |
| 2022/0128383 | A1 | 4/2022 | Huang et al. |
| 2023/0314605 | A1 * | 10/2023 | Costa ..................... G01L 1/242 356/4.01 |
| 2024/0012167 | A1 * | 1/2024 | Chen ...................... G01V 1/001 |
| 2024/0134076 | A1 * | 4/2024 | Chen ...................... G01V 1/001 |

FOREIGN PATENT DOCUMENTS

| | | | |
|---|---|---|---|
| EP | 3933371 | A1 | 1/2022 |
| GB | 2442745 | A | 4/2008 |
| WO | 2007036051 | A1 | 4/2007 |
| WO | 2014201057 | A2 | 12/2014 |
| WO | 2017127212 | A1 | 7/2017 |
| WO | 2017139579 | A1 | 8/2017 |
| WO | 2020032878 | A1 | 2/2020 |

OTHER PUBLICATIONS

Zhaoyong Wang, Bin Lu, Qing Ye, Haiwen Cai. Recent Progress in Distributed Fiber Acoustic Sensing with ϕ-OTDR. Published: Nov. 18, 2020 MDPI Journals-Sensors-vol. 20 Issue 22. [online], [retrieved on Jun. 24, 2022]. Retrieved from the Internet <URL: https://doi.org/10.3390/s20226594>.

Hino Tomoyuki, Aono Yoshiaki, Ming-Fang Huang, Tanaka Toshiaki, Sakurai Hitoshi. Optical Fiber Sensing Technology Visualizing the Real World via Network Infrastructures. Jan. 2020 NEC Technical Journal vol. 14 No. 1 Special Issue on AI and Social Value Creation [online], [retrieved on Jul. 5, 2022]. Retrieved from the Internet <URL: https://www.nec.com/en/global/techrep/journal/g19/n01/190119.html>.

Tiejun J. Xia, Glenn A. Wellbrock, Ming-Fang Huang, Shaobo Han, Yuheng Chen, Milad Salemi, Philip N. Ji, Ting Wang and Yoshiaki Aono. Field Trial of Abnormal Activity Detection and Threat Level Assessment with Fiber Optic Sensing for Telecom Infrastructure Protection. Optical Fiber Communication Conference 2021 © OSA. 2021 Washington, DC United States Jun. 6-11, 2021 ISBN: 978-1-943580-86-6. [online], [retrieved on May 28, 2022]. Retrieved from the Internet <URL: https://opg.optica.org/abstract.cfm?uri=OFC-2021-Th4H.3>.

María R. Fernandez-Ruiz, Luis Costa and Hugo F. Martins. Distributed Acoustic Sensing Using Chirped-Pulse Phase-Sensitive OTDR Technology. Published: Oct. 9, 2019 Sensors 2019, vol. 19, issue 20, 4368 [online], [retrieved on Jun. 24, 2022]. Retrieved from the Internet <URL: https://doi.org/10.3390/s19204368>.

Maria R. Fernandez-Ruiz, Juan Pastor-Graells, Hugo F. Martins, Andres Garcia-Ruiz, Sonia Martin-Lopez, and Miguel Gonzalez-Herraez. Laser Phase-Noise Cancellation in Chirped-Pulse Distributed Acoustic Sensors. Article in Journal of Lightwave Technology, Oct. 2017 [online], [retrieved on Jun. 24, 2022]. Retrieved from the Internet <URL: https://www.researchgate.net/profile/Andres-Garcia-Ruiz/publication/320638820_Laser_Phase-Noise_Cancellation_in_Chirped-Pulse_Distributed_Acoustic_Sensors/links/5a673dc6aca2720266b44276/Laser->.

Yonas Muanenda. Recent Advances in Distributed Acoustic Sensing Based on Phase-Sensitive Optical Time Domain Reflectometry. Hindawi Journal of Sensors vol. 2018, Article ID 3897873, 16 pages Published May 13, 2018 [online], [retrieved on Jun. 24, 2022]. Retrieved from the Internet <URL: https://downloads.hindawi.com/journals/js/2018/3897873.pdf?_ga=2.50076832.781370192.1687980500-60385717.1687980500> <URL: https://doi.org/10.1155/2018/3897873>.

Yonas Muanenda, Claudio J. Oton, Stefano Faralli, Fabrizio Di Pasquale. A Cost-Effective Distributed Acoustic Sensor Using a Commercial Off-the-Shelf DFB Laser and Direct Detection Phase-OTDR. IEEE Photonics Journal, vol. 8, No. 1, Feb. 2016. [online], [retrieved on Jun. 24, 2022]. Retrieved from the Internet <URL: https://ieeexplore.ieee.org/stamp/stamp.jsp?tp=&arnumber=7355285> <URL: https://ieeexplore.ieee.org/document/7355285>. <DOI: 10.1109/JPHOT.2015.2508427>.

Hisashi Izumita, Shin-ichi Furukawa, Yahei Koyamada, and Izumi Sankawa. Fading Noise Reduction in Coherent OTDR. IEEE Photonics Technology Letters, vol. 4, No. 2, Feb. 1992 p. 201-203. [online], [retrieved on Jun. 3, 2022]. Retrieved from the Internet <URL: https://ieeexplore.ieee.org/document/122361>. <DOI: 10.1109/68.122361>.

Juan C. Juarez, Eric W. Maier, Kyoo Nam CHOI, Henry F. Taylor. Distributed Fiber-Optic Intrusion Sensor System. Journal of Lightwave Technology, vol. 23, No. 6, Jun. 2005, pp. 2081-2087. [online], [retrieved on Jul. 28, 2022]. Retrieved from the Internet <URL: https://ieeexplore.ieee.org/document/1440515>. <DOI: 10.1109/JLT.2005.849924>.

R. Juskaitis, A. M. Mamedov, V. T. Potapov, S. V. Shatalin. Interferometry with Rayleigh backscattering in a single-mode optical fiber. Optical Society of America, Optics Letters, vol. 19, No. 3, pp. 225-227, Feb. 1, 1994. [online], [retrieved on Jul. 28, 2022]. Retrieved from the Internet <URL: https://opg.optica.org/ol/viewmedia.cfm? uri=ol-19-3-225&seq=0>. <https://doi.org/10.1364/OL.19.000225>.

Austin Park, Intelligent Perimeter & Intrusion Detection Fiber Optic Sensing. NEC Corporation of America Advanced Recognition System, Nov. 6, 2019. [online], [retrieved on Jul. 5, 2022]. Retrieved from the Internet <URL: https://alert.northeastern.edu/assets/adsa/adsa21_presentations/26_Park.pdf>.

Arthur H. Hartog. An Introduction to Distributed Optical Fibre Sensors. CRC Press Taylor and Francis Group, Series in fiber optic sensors, 2017, p. 235-240, 275-276.

D. Villafani Caballero, J. P. von der Weid, Patryk Urban. Tuneable OTDR measurements for WDM-PON monitoring Conference: Microwave & Optoelectronics Conference (IMOC), 2013 SBMO/IEEE MTT-S International Conference Paper • Aug. 2013 [online], [retrieved Mar. 20, 2015]. Retrieved from the Internet <URL: https://www.researchgate.net/profile/Diego-Rodrigo-Villafani-Caballero/publication/261245400_Tuneable_OTDR_measurements_for_WDM-PON_monitoring/>.

K De Souza. Significance of coherent Rayleigh noise in fibre-optic distributed temperature sensing based on spontaneous Brillouin scattering. Measurement Science and Technology, vol. 17, No. 5, pp. 1065-1069 Published Apr. 7, 2006 • IOP Publishing Ltd [online], [retrieved on Sep. 21, 2022]. Retrieved from the Internet <URL:

(56) References Cited

OTHER PUBLICATIONS https://iopscience.iop.org/article/10.1088/0957-0233/17/5/S21><DOI 10.1088/0957-0233/17/5/S21>.

H. Chen, R. Baribault, M. Leclerc, É. Morin-Drouin, S. Perron, B. Ruchet, É. Thomassin, G. W. Schinn. Widely Tunable SOA-Based OTDR Employing a Cost-Effective Source Configuration. Optical Fiber Communication (OFC) Conference, Mar. 4-8, 2012, Los Angeles, CA, USA. [retrieved on Sep. 23, 2022]. Retrieved from the Internet <URL: https://ieeexplore.ieee.org/document/6476223>.

Unknown Author, Laser Lab Source. Semiconductor Optical Amplifier (SOA) Ultra-Fast PULSE and CW Control Electonics and Mounting Module. Datasheet [online]. Laser Diode Control [retrieved on Sep. 14, 2022]. Retrieved from the Internet: <URL: https://www.laserdiodecontrol.com/files/pdfs/laserdiodecontrol_com/8303/DATA_SHEET_Semiconductor_Optical_Amplifier_SOA_Ultra_Fast_PULSE_and_CW_Mode_Control_Electonics_and_Mounting_Module_Model_SOA_STD_Control_and_Mount_Module-1659477884.pdf>.

* cited by examiner

*Combined Coherent Laser OTDR And Un-Coherent Laser OTDR*

METHOD AND APPARATUS OF DISTRIBUTED ACOUSTIC SENSING

TECHNICAL FIELD

The present description generally relates to method and apparatus of fiber optic distributed acoustic sensing (DAS) employed, e.g., for the applications of fiber cable monitoring, fiber cable route data collection, and fiber cable troubleshooting for fiber optic telecommunication networks and/or monitoring third-party interference of the fiber optic perimeter intrusions.

BACKGROUND

Distributed Acoustic Sensing (DAS) is a technology that enables continuous, real-time measurements along the entire length of a fiber optic cable to provide distributed strain and vibration sensing. DAS technology is used in the art to detect intrusion in security perimeter monitoring, to monitor highway traffic, monitor pipelines, etc.

Rayleigh scatter-based DAS uses a Coherent OTDR (C-OTDR) where a coherent laser pulse is sent along the optical fiber. As similar measurement technique in conventional OTDRs, for the C-OTDR the interfered intensities of any two or more reflected coherent lights are measured as a function of time after transmission of the laser pulse. Changes in the reflected interfered intensity of successive pulses reflected from a same section of fiber are indicative of a disturbance along that section.

DAS technology can be split into two main variations (see Hartog, "An introduction to distributed optical fibre sensors", CRC Press, pp. 235-240), i.e., differential phase-based DAS and amplitude-based DAS. The differential phase DAS is more reliable but is also more complex, very expensive, bulky in size and not very reliable for the field application because of the too complicated instrument design. The amplitude-based DAS variation is simpler but suffers from a lack of linearity due to its unpredictable variation of the transfer function along the fiber. It can still be very useful to detect disturbances along the optical fiber (see Hartog). But in both versions, the laser source needs to be highly coherent, low-noise and very stable in order to allow for the acquired data to be meaningful. Such lasers are inevitably expensive. Both versions also require expensive high-speed sampling digitizers for real-time acquisition and expensive real-time processing of large amount of acquired data.

There therefore remains a need for a simple and low-cost DAS system that can still provide reliable monitoring results for optical fiber monitoring and troubleshooting applications in optical fiber telecommunication networks.

SUMMARY

The proposed solution aims at providing a simple and low-cost DAS system, while still providing reliable monitoring results for optical fiber monitoring and troubleshooting applications in optical fiber telecommunication networks. The cost of the solution is reduced by employing a low-cost coherent laser and low-cost acquisition and processing electronics in an amplitude-based Rayleigh scatter DAS.

In accordance with one aspect, such low-cost solution is made possible by employing grouped data signal processing. Data is processed over independent groups of data (or time buckets) to provide an independent DAS signal for each group. This allows measurements to be less sensitive to undesired laser fluctuations and thereby reduces coherent laser technical specification requirements and allows the use of a low-cost coherent laser (thereby reducing the cost of the laser).

In accordance with another aspect, quasi-continuous data sampling may be employed. Data may be acquired in continuous but only over short periods of time (corresponding to groups), with a time lapse $\Delta T$ in-between to prevent memory saturation and allow time for processing the acquired data before the next acquisition. This technique reduces requirements for digitizer's data sampling, data transferring and saving, and digital signal processing (thereby reducing the cost of the sampling and acquisition electronics).

In accordance with one aspect, there is provided a method and an apparatus of fiber optic distributed acoustic sensing (DAS) which use an independent quasi-continuous sampled group data acquisition technique and independent group data signal processing. The provided technique allows for using commercially existing low-cost OTDR opto-electronics.

In some embodiments, the DAS interrogator may also be designed to have several DAS acquisition channels sharing one low-noise laser for simultaneous fiber security monitoring applications, which may lead a further cost reduction for the DAS interrogator product design.

Moreover, in some embodiments, the described DAS interrogator may also be used as an un-coherent laser OTDR for real-time instantaneous fiber loss and loss variation measurement for the applications of optic fiber cables monitoring and testing.

In accordance with another aspect, there is provided a DAS interrogator which can also be used as an un-coherent laser OTDR for real-time instantaneous fiber loss and/or loss variation measurement for the applications of optic fiber cables monitoring and testing. A DAS acquisition apparatus combines both a coherent laser OTDR and an un-coherent laser OTDR for allowing real-time monitoring of both fiber vibrations and fiber loss variations in a hardware efficient, low-cost and compact manner. The DAS acquisition apparatus comprises a conventional OTDR instrument, except that the OTDR pulsed light source is replaced by a coherent light source consisting of a CW coherent laser followed by a SOA driven by a pulse generator. When the CW coherent laser is turned on (coherent OTDR mode of operation), a coherent pulsed DAS interrogator is obtained for fiber vibration monitoring. But when the CW coherent laser is turned off (un-coherent OTDR mode of operation), the SOA can be employed as an un-coherent pulsed light source (e.g., with an un-coherent laser spectral bandwidth of greater than about 30 nm to 50 nm), to thereby obtain an un-coherent OTDR interrogator for fast fiber loss variation monitoring. This provides a very low coherent noise (e.g., about 0.01 dB) thereby allowing to monitor very small loss and loss variations (e.g., <0.01 dB).

Also, by using quasi-continuous sampling method for the OTDR data acquisition, it allows to use a low-cost commercially available OTDR opto-electronics to design a low-cost, compact and easy to use instrument (DAS and OTDR) that is suitable for monitoring both fiber vibrations and fiber loss variations in real-time for optical fiber cables that are used for telecommunication applications.

In accordance with yet another aspect, there is provided a method and an apparatus of fiber optic distributed acoustic sensing (DAS) which use a simple, reliable and robust signal processing for amplitude-based DAS measurements. The proposed processing may be employed with DAS data acquired in groups as described herein. 1) The lack of linearity of the amplitude-based DAS measurement (due to its unpredictable variation of the transfer function along the fiber) can be improved by normalizing the amplitude vs distance using an amplitude-normalization trace obtained from either a) coherent laser OTDR measurements with laser frequency dithering or b) computing a normalization trace from the coherent OTDR/DAS traces or the un-coherent OTDR/DAS traces (by averaging & smoothing). 2) Instrument offset (e.g., due to low vertical sampling resolution) may be corrected using un-coherent OTDR/DAS traces to extract an instrument system offset. This step can be skipped in case of higher resolution.

In accordance with one aspect, there is provided a method for performing acoustic and vibration measurements based on fiber optic distributed acoustic sensing (DAS), the method comprising:

performing repetitive DAS acquisitions toward an optical fiber link using a DAS acquisition device comprising a coherent Optical Time Domain Reflectometer (OTDR) to provide a group of K DAS traces, wherein each DAS acquisition is performed by propagating in the optical fiber link, a pulsed test signal and detecting corresponding return light from the optical fiber link so as to obtain a DAS trace representing backscattered and reflected light as a function of distance in the optical fiber link;

processing said group of DAS traces to produce a DAS signal associated with said group; and repeating said performing repetitive DAS acquisitions and said processing said group of DAS traces to obtain a plurality of independent groups of DAS traces and a corresponding plurality of DAS signals, such that independent DAS signals are obtained using said independent groups of DAS traces, thereby reducing a sensitivity of the measurements to undesired fluctuations of a light source of the DAS acquisition device.

In accordance with another aspect, there is provided a fiber optic distributed acoustic sensing (DAS) system for performing acoustic and vibration measurements, the DAS system comprising:

a DAS acquisition device connectable toward an optical fiber link and comprising a coherent Optical Time Domain Reflectometer (OTDR) for performing repetitive DAS acquisitions, wherein each DAS acquisition is performed by propagating in the optical fiber link, a pulsed test signal and detecting corresponding return light from the optical fiber link so as to obtain a DAS trace representing backscattered and reflected light as a function of distance in the optical fiber link, wherein DAS traces are acquired in groups to provide a plurality of groups of K DAS traces;

a memory to store said groups of DAS traces, at least one group of DAS traces at a time; and a processing unit receiving and independently processing each group of DAS traces to produce corresponding DAS signals, such that independent DAS signals are obtained using independent groups of DAS traces, thereby reducing a sensitivity of the measurements to undesired fluctuations of a light source of the DAS acquisition device.

In accordance with another aspect, there is provided a non-transitory computer-readable storage medium comprising instructions that, when executed, cause a processor to perform the steps of:

receiving groups of K distributed acoustic sensing (DAS) acquisitions performed toward an optical fiber link using a DAS acquisition device comprising a coherent Optical Time Domain Reflectometer (OTDR), wherein each DAS acquisition is performed by propagating in the optical fiber link, a pulsed test signal and detecting corresponding return light from the optical fiber link so as to obtain a DAS trace representing backscattered and reflected light as a function of distance in the optical fiber link; and independently processing each group of DAS traces to produce corresponding DAS signals, such that independent DAS signals are obtained using independent groups of DAS traces, thereby reducing a sensitivity of the measurements to undesired fluctuations of a light source of the DAS acquisition device.

In accordance with yet another aspect, there is provided a fiber optic distributed acoustic sensing (DAS) acquisition device for performing acoustic and vibration measurement as well as optical fiber loss measurement, the DAS acquisition device comprising:

a light generating assembly to be coupled to the optical fiber link for generating and propagating in the optical fiber link a test light signal comprising test light pulses, the light generating assembly comprising:

a coherent light source to produce continuous wave coherent light;

a semiconductor optical amplifier receiving light from said coherent light source;

a pulse generator connected to the semiconductor optical amplifier to drive it to generate said test light pulses; and a detection module for detecting corresponding return light from the optical fiber link so as to acquire a reflectometric trace representing backscattered and reflected light as a function of distance along the optical fiber link;

wherein in a coherent OTDR mode of operation, said coherent light source is turned on so that said light generating assembly produces a coherent pulsed test light signal, so as to acquire DAS traces for acoustic and vibration measurement; and wherein in an un-coherent OTDR mode of operation, said coherent light source is turned off so that said light generating assembly produces an un-coherent pulsed test light signal, so as to acquire un-coherent reflectometric traces for optical fiber loss measurement.

In this specification, unless otherwise mentioned, word modifiers such as "substantially" and "about" which modify a value, condition, relationship or characteristic of a feature or features of an embodiment, should be understood to mean that the value, condition, relationship or characteristic is defined to within tolerances that are acceptable for proper operation of this embodiment in the context its intended application.

In the present description, and unless stated otherwise, the terms "connected", "coupled" and variants and derivatives thereof refer to any connection or coupling, either direct or indirect, between two or more elements. The connection or coupling between the elements may be mechanical, physical, operational, electrical or a combination thereof.

Further features and advantages of the present invention will become apparent to those of ordinary skill in the art upon reading of the following description, taken in conjunction with the appended drawings.

The following description is provided to gain a comprehensive understanding of the methods, apparatus and/or systems described herein. Various changes, modifications, and equivalents of the methods, apparatuses and/or systems described herein will suggest themselves to those of ordinary skill in the art. Description of well-known functions and structures may be omitted to enhance clarity and conciseness.

Although some features may be described with respect to individual exemplary embodiments, aspects need not be limited thereto such that features from one or more exemplary embodiments may be combinable with other features from one or more exemplary embodiments.

BRIEF DESCRIPTION OF THE DRAWINGS

FIG. 7 comprises FIG. 7A, FIG. 7B and FIG. 7C, wherein

DETAILED DESCRIPTION

Figure 1A:
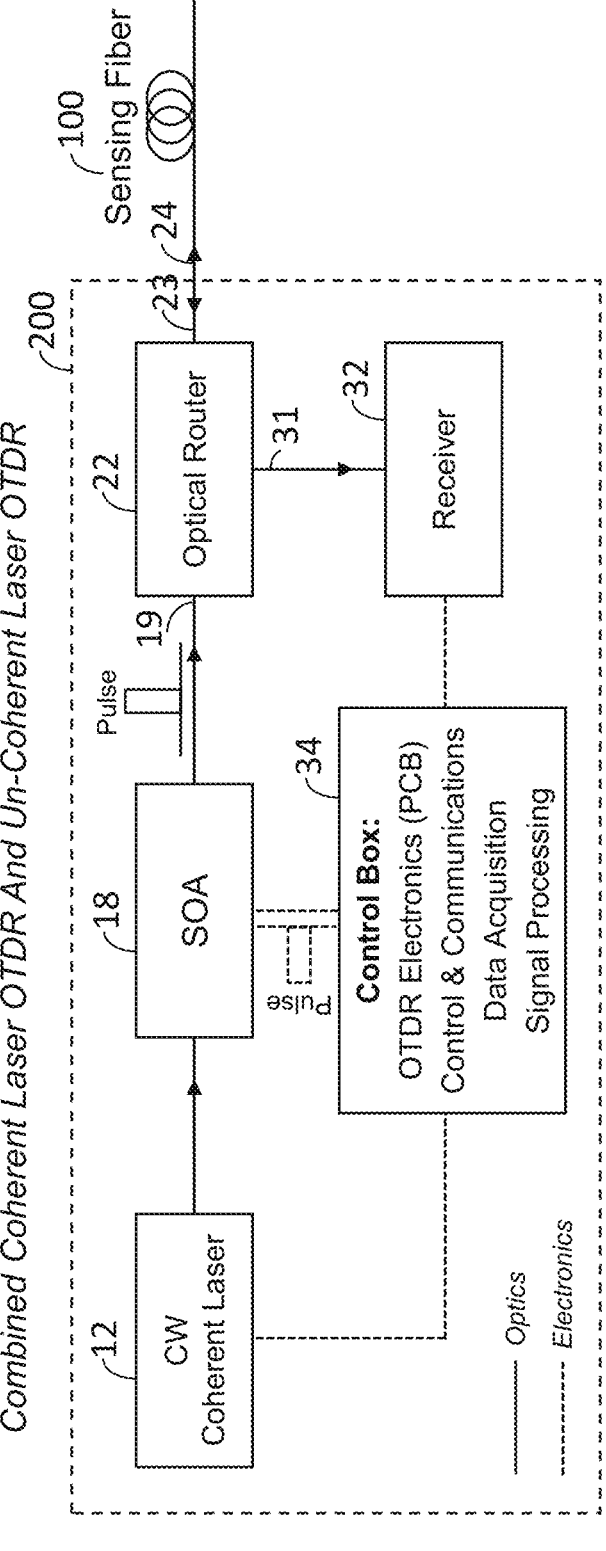
FIG. 1A is a block diagram illustrating a coherent laser OTDR based DAS acquisition apparatus which combines both coherent laser OTDR and un-coherent laser OTDR, where a commercially available OTDR opto-electronics is used.

Measurement Principles:

There are herein provided improved methods and apparatuses for fiber optic distributed acoustic sensing (DAS), especially related to independent group data based quasi-continuous sampled data acquisition and independent group data signal processing for coherent laser Optical Time Domain Reflectometer (OTDR) based fiber optic DAS interrogator, which may enable for using a low-cost commercially available OTDR opto-electronics to provide low-cost and reliable field acoustic and vibration monitoring and measurement that can be employed for the applications of fiber cable monitoring, fiber cable route data collection, and fiber cable troubleshooting for fast to locate fiber cable broken point for the fiber optic telecommunication networks or of monitoring third-party interference of the fiber optic perimeter intrusions. An improved fiber optic DAS is therefore used to detect acoustic or vibration signals, wherein the fiber optic DAS comprises at least one optical fiber deployed in an area of interest or telecommunication network.

In accordance with a first aspect, the method and apparatus of low-cost field fiber optic DAS interrogator system apparatus use commercially available OTDR which uses independent group data based quasi-continuous sampled data acquisition technique, wherein a (user defined, software defined or default) number of coherent laser OTDR traces for each data group are acquired with a minimum time lapse between any two neighbored DAS traces, for example 64 DAS traces with any time lapse defined by user or advantageously a minimum time lapse between any two neighbored DAS traces may be used, which time lapse is determined by the tested or monitored fiber cable length, and such data group acquisition is repeated in quasi-continuous sampling mode or in continuous sampling mode with any time lapse between any two neighbored data groups, for example such data group data acquisition is repeated for 1,250,000 times or any times defined by user for each data group. In practice, DAS traces are coherent OTDR traces acquired either without any averaging so to obtain a maximum vibration frequency response or with some minimal averaging for gaining more dynamics so to reduce vibration response frequency. For a low-cost reason commercially existed OTDR opto-electronics such as low-cost low performance ADC and FPGA can be directly used for above-described improved DAS system design with minimum modification. The DAS quasi-continuous sampling method can also have less or much less acquired data size for example about 10% to 90% dependent on the design in comparison to a real-time acquisition so that commercially available field industrial computer or field platform host computer can also be used for the DAS signal processing and data saving.

The above-described method and apparatus of field fiber optic DAS interrogator may also be employed optionally to use low-cost low vertical sampling resolution or low bits data sampling devices that are typically used in commercially existing OTDR such as low-cost low bits digitizer (ADC and FPGA). It should be noted that by using low-cost low vertical sampling resolution or low bits data sampling devices may reduce the DAS detection sensitivity but we observed that our DAS system still have an enough detection sensitivity for example of 10 nε to 100 nε DAS detection sensitivity that is sufficient for the acoustic and vibration detection for the most of practical applications such as for fiber cables monitoring, fiber cable route data collection, and fiber cable troubleshooting for fast to locate fiber cable broken point for the telecommunication fiber optics networks.

In accordance with a second aspect, the method and apparatus of low-cost field fiber optic DAS interrogator for using commercially available OTDR uses independent group data signal processing for data acquired from independent group data acquisition with either quasi-continuous sampling mode or even continuous sampling mode. For example, one group data contains 64 traces or any (user defined, software defined or default) number of DAS traces, and such independent group data signal processing may repeatedly be performed for all N or partial number n of acquired independent group data for N or n times, where $1^{st}$, $2^{nd}, \ldots, n^{th}, \ldots, N^{th}$ are all acquired independent group data from quasi-continuous or continuous sampling and $1^{st}$, $2^{nd}, \ldots, n^{th}$ are partial acquired independent group data from quasi-continuous or continuous sampling.

It should be noted that independent group data acquisition and independent group data signal processing can allow to use a low performance low-noise laser, for example low phase noise and narrow linewidth DFB laser, to save the instrument cost but without decreasing too much DAS interrogator instrument performance, e.g. DAS signal to noise ratio (SNR), because a group data signal processing is used to process multiple DAS OTDR traces e.g. 64 to improve a SNR for the DAS. It should also be noted that independent group data acquisition and independent group data signal processing means that each group data is independent without any influence on any other group data so that the laser frequency and phase stability are only required to be stable enough for a short time period, i.e. an acquisition time for acquiring one group data, for example, 32 ms for acquiring K=64 coherent laser OTDR traces for a sensing optic fiber length of 40 km or less than 50 km. It should be also noted that time lapse ΔT between any two groups data (see FIG. 3A) can be set by user manually such as from 10% to 90% of an acquisition time for acquiring one group DAS traces or can be a default hardcoded value or a software determined value computer selected according to an existed OTDR electronics (ADC and FPGA) performance capability including FPGA signal processing, on-board memory, data transferring and saving, etc., for example for setting a ΔT=38 ms for above K=64 group data acquisition time of 32 ms for 40 km to 50 km fiber length.

Furthermore, advantageously independent group data acquisition for the DAS's quasi-continuous sampling mode or continuous sampling mode then independent group data signal processing can lead DAS interrogator more robust and reliable for the field application.

In some embodiments, the above-described methods of quasi-continuous sampled independent data group data acquisition and independent data group signal processing for coherent laser OTDR based fiber optic DAS interrogator may further include one or more of the following steps for the data group-based data acquisition and data group-based signal processing as:

a) providing coherent laser OTDR DAS data group-based data acquisition configuration:
1) setting DAS acquisition configuration by either default or using manually setting such as pulse length, fiber length (so having a coherent laser OTDR acquisition time Δt that may be obtained as two times fiber length dividing a light speed in the optic fiber), monitoring or measurement time, data sampling mode i.e., quasi-continuous or continuous sampling, acquisition mode such as either set as for fiber monitoring or measurement, as well selecting any other coherent laser OTDR DAS acquisition parameters;

2) instrument may automatically calculate or set other coherent laser OTDR DAS acquisition parameters such as APD gain, sampling rate, averaging, filtering, time lapse $\delta t$ (between coherent laser OTDR traces), group trace number (K), group data time lapse $\Delta T$ (between data groups), data group number (N), etc.;

b) optionally performing an un-coherent laser OTDR DAS data acquisition but using the same acquisition setting parameters for coherent laser OTDR along the optical fiber cable using an un-coherent laser OTDR apparatus connected to the optical fiber cable and operating under said un-coherent laser OTDR acquisition conditions by launching series of incoherent laser OTDR pulses, thereby obtaining at least one (1) reflectometric trace but ideally many reflectometric traces representing a proximal portion of the optical fiber cable;

c) optionally performing a coherent laser OTDR DAS data acquisition under dithering the laser frequency either by laser operation current or laser temperature control but using the same acquisition setting parameters for coherent laser OTDR along the fiber cable using an OTDR apparatus connected to the optical fiber cable and operating under said coherent laser OTDR acquisition conditions by launching series of coherent laser OTDR pulses, thereby obtaining at least one (1) reflectometric trace but ideally many reflectometric traces representing a proximal portion of the optical fiber cable;

d) initialing coherent laser OTDR DAS data acquisition loop for acquiring total N groups of reflectometric traces, each group containing K reflectometric traces with a group data time lapse $\Delta T$ (between data groups), wherein the data acquisition mode may be selected by design or user defined, i.e., either quasi-continuous or continuous sampling;

e) for each group n, performing a coherent laser OTDR DAS data acquisition along the sensing optic fiber cable using a coherent laser OTDR apparatus connected to the optic fiber cable and operating under said coherent laser OTDR acquisition conditions by launching series of coherent laser OTDR pulses, to obtain a group of DAS reflectometric traces e.g., K=64 traces;

f) for each group n, performing a coherent laser OTDR DAS data group-based signal processing as:

1) performing coherent laser OTDR DAS signal processing to obtain Root Mean Square (RMS) difference for each individual group of K DAS traces, i.e., compute $n^{th}$ group data K DAS traces' Root Mean Square (RMS) difference as:

$$\sqrt{\langle \Delta P_{(n,k)}(z)^2 \rangle_K} \quad \text{for the } n^{th} \text{ group data} \tag{1}$$

where $\Delta P_{(n,k)}(z)$ is computed $n^{th}$ group data $k^{th}$ DAS trace difference to a mean power value within each data group as, $$\Delta P_{(n,k)}(z) = P_{(n,k)}(z) - \langle P_n(z) \rangle \tag{2}$$

where k=1, 2, . . . , K and n=1, 2, . . . , N, and where $n^{th}$ group data of K DAS traces' mean value $\langle P_n(z) \rangle$ is calculated from, $$\langle P_n(z) \rangle = \sum_{k=1}^{K} (P_{(n,k)}(z))/K \tag{3}$$

for example, for here for n=1 for $1^{st}$ group data K DAS traces' Root Mean Square (RMS) difference as, $$\sqrt{\langle \Delta P_{(1,k)}(z)^2 \rangle_K} \quad \text{for the } 1^{st} \text{ group data} \tag{4}$$

where P is detected power, z is fiber distance, k is DAS trace index, K is total number of DAS trace in each data group, n group data index, and N is total number of data groups.

2) optionally, if there may be any uncoherent noise from the DAS instrument, such as low-cost low sampling resolution digitizer, then performing the same step 1) signal processing by using acquired one group data un-coherent laser OTDR traces (obtained in step b) to extract an instrument system offset, i.e., compute un-coherent laser OTDR K traces' RMS difference using acquired K OTDR traces $P_{0(k)}(z)$ by un-coherent laser OTDRs for one group data (k=1, . . . , k, . . . , K) or advantageously many such groups' data for improved accurate measurement:

$$\sqrt{\langle \Delta P_{0(k)}(z)^2 \rangle_K} \tag{5}$$

where $k^{th}$ OTDR trace difference $\Delta P_{0(k)}$ (z) is calculated as, $$\Delta P_{0(k)}(z) = P_{0(k)}(z) - \langle P_0(z) \rangle \tag{6}$$

and K OTDR traces' mean value $\langle P_0(z) \rangle$ is computed as, $$\langle P_0(z) \rangle = \sum_{k=1}^{K} (P_{0(k)}(z))/K \tag{7}$$

where $P_0$ is detected power from un-coherent laser OTDR, z is fiber distance, k is DAS trace number, and K is total number of DAS trace in each data group. The compute un-coherent laser OTDR K traces' RMS difference, i.e., un-coherent noise or un-coherent offset, therefore, any un-coherent offset or un-coherent noise from the DAS instrument including digitizer can be removed from above computed RMS difference for each individual group of DAS traces acquired from coherent laser OTDR, i.e., $n^{th}$ group data un-normalized DAS signal $\sqrt{\langle \Delta P_n(z)^2 \rangle}$ without un-coherent noise or un-coherent offset is given as, $$\sqrt{\langle \Delta p_n(z)^2 \rangle} = \sqrt{\langle \Delta P_{(n,k)}(z)^2 \rangle_K} - \sqrt{\langle \Delta P_{0(k)}(z)^2 \rangle_K} \text{ for the } n^{th} \text{ group data} \tag{8}$$

for example, for n=1 for $1^{st}$ group data K DAS traces' Root Mean Square (RMS) difference is given as, $$\sqrt{\langle \Delta P_1(z)^2 \rangle} = \sqrt{\langle \Delta P_{(1,k)}(z)^2 \rangle_K} - \sqrt{\langle \Delta P_{0(k)}(z)^2 \rangle_K} \text{ for the } 1^{st} \text{ group data} \tag{9}$$

alternatively, also optionally, if there may be any uncoherent noise from the DAS instrument, such as low-cost low sampling resolution digitizer, performing the same step 1) signal processing by using acquired any one group data coherent laser OTDR traces, e.g. $i^{th}$ group data from N group data (i=1 or 2 or . . . , or n, . . . , or N), to extract an instrument system offset, i.e., compute coherent laser OTDR K traces' RMS difference using acquired K OTDR traces $P_{(i,k)}$ (z) from coherent laser OTDRs for the selected group data (k=1, . . . , k, . . . , K) or advantageously many such groups' data for improved accurate measurement:

$$\sqrt{\langle \Delta P_{(i,k)}(z)^2 \rangle}_K \qquad (10)$$

where $k^{th}$ OTDR trace difference $\Delta P_{(i,k)}(z)$ is calculated as, $$\Delta P_{(i,k)}(z) = P_{(i,k)}(z) - \langle P_i(z) \rangle \qquad (11)$$

and K OTDR traces' mean value $\langle P_i(z) \rangle$ is computed as, $$\langle P_i(z) \rangle = \sum_{k=1}^{K} (P_{(i,k)}(z))/K \qquad (12)$$

where P is detected power from coherent laser OTDR, z is fiber distance, k is DAS trace number, and K is total DAS trace in each data group.

then un-coherent noise or un-coherent offset can be obtained e.g., by filtering those coherent signals from processed filter ($\sqrt{\langle \Delta P_{(i,k)}(z)^2 \rangle}_K$) such as using a median filter or using similar signal processing method to extract the low-frequency signal from processed filter ($\sqrt{\langle \Delta P_{(i,k)}(z)^2 \rangle}_K$), therefore, any un-coherent offset or un-coherent noise from the instrument including digitizer can be removed from above computed RMS difference for each individual group DAS traces acquired from coherent laser OTDRs, i.e., $n^{th}$ group data un-normalized DAS signal $\sqrt{\langle \Delta P_n(z)^2 \rangle}$ without un-coherent noise or un-coherent offset is given as, for the $n^{th}$ group data:

$$\sqrt{\langle \Delta P_n(z)^2 \rangle} = \sqrt{\langle \Delta P_{(n,k)}(z)^2 \rangle}_K - \text{filter} (\sqrt{\langle \Delta P_{(i,k)}(z)^2 \rangle}_K) \qquad (13)$$

for example, for n=1 for 1st group data K DAS traces' Root Mean Square (RMS) difference is given as, $$\sqrt{\langle \Delta P_1(z)^2 \rangle} = \sqrt{\langle \Delta P_{(1,k)}(z)^2 \rangle}_K - \text{filter} (\sqrt{\langle \Delta P_{(i,k)}(z)^2 \rangle}_K) \qquad (14)$$

3) performing the same step 1) signal processing by using acquired coherent laser OTDR traces under dithering the laser frequency to acquire K OTDR traces $P_{dither(i,k)}(z)$ for each group for I groups, where i=1, . . . , i, . . . , I, e.g., I=100; k=1, . . . , k, . . . , K, e.g., K=64, (acquired in step c) to obtain normalization trace vs distance z, i.e., such as to compute $i^{th}$ group coherent laser frequency dithered OTDR RMS difference subtracts un-coherent laser OTDR RMS difference to have $\sqrt{\langle \Delta P_{dither(i,k)}(z)^2 \rangle}_K$, i.e., variance $\Gamma(z)$ as, $$\Gamma(z) = \sqrt{\langle (P_{dither(i,k)}(z) - \sum_{k=1}^{K}(P_{dither(i,k)}(z))/K)^2 \rangle_K} - \sqrt{\langle \Delta P_{0(k)}(z)^2 \rangle_K} \qquad (15)$$

where K is a total DAS trace number in each data group, and i may be equal 1 or any number of data group that is acquired.

It should be noted that a normalization trace vs distance z may be an averaging over several computed un-coherent laser OTDR RMS differences from different group data of acquired coherent laser OTDR traces under dithering the laser frequency, i.e., to compute an averaged variance $\Gamma(z)$ as, $$\Gamma(z) = \sum_{i=1}^{I} \left( \sqrt{\langle \Delta P_{dither(i,k)}(z)^2 \rangle_K} \right)/I \qquad (16)$$

where I is a total group data number, e.g., from 1 to 1000.

4) performing normalization procedure to obtain DAS signal for the $n^{th}$ group DAS reflectometric traces using processed $n^{th}$ group coherent laser OTDR traces' result (acquired in step e) optionally after subtracting an instrument system offset or un-coherent offset from steps 1) or 2) to divide processed results from step 3), i.e., to obtain final $n^{th}$ group data normalized DAS signal $\sqrt{\langle \Delta T_n(z)^2 \rangle}$ as, $$\sqrt{\langle \Delta T_n(z)^2 \rangle} = \frac{\sqrt{\langle \Delta P_n(z)^2 \rangle}}{\Gamma(z)} \text{ for the } n^{th} \text{ group data} \qquad (17)$$

for example, for n=1 for the $1^{st}$ group data K DAS traces' Root Mean Square (RMS) difference as:

$$\sqrt{\langle \Delta T_1(z)^2 \rangle} = \frac{\sqrt{\langle \Delta P_1(z)^2 \rangle}}{\Gamma(z)} \text{ for the } 1^{st} \text{ group data} \qquad (18)$$

5) transferring and saving processed data and displaying DAS signal for the $1^{st}$ and or the $n^{th}$ group DAS reflectometric traces.

alternatively, for steps 3) to 5) may be performed as below steps as:

3') performing the same step 1) signal processing by using acquired coherent laser OTDR traces to obtain normalization trace vs distance z, i.e., such as to compute local coherent laser OTDR traces RMS difference $\sqrt{\langle \Delta P_{(j,z)}(z_0)^2 \rangle}_{\Delta z}$ that is computed local DAS RMS difference of $P_{(j,z)}$ ($z_0$) to mean DAS value $\langle P_{(j,z)}$ ($z_0$) \rangle , i.e. $\Delta P_{(j,z)}(z_0) = P_{(j,z)}(z_0) - \langle P_{(j,z)}$ ($z_0$) \rangle from any DAS trace at user selected location $z_0$ or reference fiber located inside the DAS interrogator for a given fiber length $\Delta z$ e.g. z is from 1 km to 3 km from any e.g., $j^{th}$ coherent laser OTDR DAS trace for a short fiber length $\Delta z$ along location $z_0$, or alternatively and advantageously subtracts an coherent laser OTDR RMS difference (not shown here), i.e., to compute variance $\Gamma''(z)$ as:

$$\Gamma''(z) = \frac{\sqrt{\langle\Delta P_{(j,z)}(z_0)^2\rangle_{\Delta z}}}{\langle P_0(z_0)\rangle} \times \langle P_0(z)\rangle \qquad (19)$$

where mean value $\langle P_0(z)\rangle$ is computed from un-coherent laser OTDR trace or from coherent laser DAS trace e.g., after filtering such as using a median filter or from laser frequency dithered coherent laser OTDR traces e.g., after averaging of many dithered coherent laser OTDR traces, and $\langle P_0(z_0)\rangle$ is computed from mean value trace at a location $z_0$ from coherent laser OTDR trace, and where j may be equal 1 or any number of DAS trace that is acquired.

It should be noted that advantageously a normalization trace vs distance z may also be an averaging of several computed coherent laser OTDR RMS differences from several DAS traces acquired from the same or different group data of acquired coherent laser OTDR traces, i.e., to compute variance $\Gamma''(z)$ as:

$$\Gamma'(z) = \Sigma_{i=1}^{I} \left( \frac{\sqrt{\langle\Delta P_{(j,z)}(z_0)^2\rangle_{\Delta z}}}{\langle P_0(z_0)\rangle} \times \langle P_0(z)\rangle \right) / I \qquad (20)$$

where I is a total DAS trace number, e.g., from 1 to 1000.

4') performing normalization procedure to obtain DAS signal for the $n^{th}$ group DAS reflectometric traces using processed $n^{th}$ group coherent laser OTDR traces' result, or alternatively and advantageously after subtracting an instrument system offset from step 2) (not shown here), to divide processed results from step 3'), i.e., to obtain final $n^{th}$ group data normalized DAS signal $\sqrt{\langle\Delta T_n(z)^2\rangle}$:

$$\sqrt{\langle\Delta T_n(z)^2\rangle} = \frac{\sqrt{\langle\Delta P_n(z)^2\rangle}}{\Gamma'(z)} \text{ for the } n^{th} \text{ group data} \qquad (21)$$

for example, for n=1 for $1^{st}$ group data K DAS traces' Root Mean Square (RMS) difference as:

$$\sqrt{\langle\Delta T_1(z)^2\rangle} = \frac{\sqrt{\langle\Delta P_1(z)^2\rangle}}{\Gamma'(z)} \text{ for the } 1^{st} \text{ group data} \qquad (22)$$

5')transferring and saving processed data and displaying DAS signal for the first (and or $n^{th}$) group DAS reflectometric traces.

g) repeating step e) above to perform coherent laser OTDR acquisitions for N times, e.g., thereby obtaining $1^{st}$ to $N^{th}$ data groups such as N=1,250,000 or any number that is not limited, where each data group contains K, e.g., K=64 or any number that is not limited. For each data group n, step f) above is repeated to perform coherent laser OTDR data group-based signal processing, for example for N times for the $1^{st}$ to $N^{th}$ data groups or k=j−i times (1<i<j≤N) for the $i^{th}$ to $j^{th}$ data groups each containing K DAS reflectometric traces, as the same steps 1), 2) (optionally), 3), 4) and 5) or 1), 2) (optionally), 3'), 4') and 5').

In the processing steps described herein, the DAS signal is obtained by calculating a Root Mean Square (RMS) difference $\sqrt{\langle\Delta P_{(n,k)}(z)^2\rangle}_K$ (for each group of K DAS traces. It should however be noted that although the RMS calculation is the conventional method known in DAS processing, such calculation can be replaced by other calculations such as, e.g., a peak-to-peak difference. Other alternative but suitable processing may be used as well. The same comment also applies to other RMS calculations described herein.

In some embodiments, a waterfall graph may be displayed for the DAS computation results using processed k (k≤N) data groups DAS traces' processed results in time domain.

In some embodiments, there may be displayed a histogram of current DAS processed result vs channel number (#) for the processed $n^{th}$ or $N^{th}$ data group DAS traces (e.g., the latest data group) or any $i^{th}$ to $j^{th}$ DAS traces, where typically a channel spacing is a sampling spatial resolution, e.g., 10.2 m or 20.4 m.

In some embodiments, there may be further displayed processed $1^{st}$ to $n^{th}$ (n< or =N) or any $i^{th}$ to $j^{th}$ DAS traces data group DAS signals at one or several user selected fiber locations/positions that are processed results in time domain/series.

In some embodiments, there may be further displayed processed $1^{st}$ to $n^{th}$ (n< or =N) or any $i^{th}$ to $j^{th}$ DAS traces data group DAS signal that are processed results in frequency domain (FFT spectrum) after the fast Fourier transform (FFT) computation for one or several user selected fiber locations/positions.

In some embodiments, the method and apparatus of low-cost field fiber optic distributed acoustic sensing (DAS) interrogator may allow to design several DAS acquisition channels by sharing one low-noise laser such as having 2, 4, 8 and 16 DAS channels for simultaneously several fiber cables' security monitoring for example using one light beam splinter (BS) to split low-noise laser to 2, 4, 8 and 16 fiber output ports then incident into several, e.g. 2, 4, 8 and 16, SOAs so to lead further instrument cost reduction.

In accordance with a third aspect, there is provided a method and an apparatus of compact low-cost field combined un-coherent laser OTDR and coherent laser OTDR allowing real-time instantaneous fiber loss, fiber loss variation, and vibration monitoring with negligible coherent noise on the OTDR trace even under minimum or no any, i.e. one, averaging and allowing to monitor instantaneous loss/vibration/acoustic signal from optical fiber cables such for example such instantaneous fiber loss, fiber loss variation, and fiber vibration such as induced by fiber strain or stress due to fast moving of fiber cables e.g. from third-party incursion/interference, and a response frequency for such monitoring can be up to 100 Hz to 1000 Hz, employed for the applications of fiber cables real-time instantaneous loss, fiber loss variation, and vibration/acoustic monitoring and fiber cable troubleshooting for the telecommunication fiber optical networks having a proximal end and a distal end.

In some embodiments of un-coherent laser OTDR for using commercially available OTDR, it may be important to use a laser with a wide laser spectral width such as of >10 nm to 50 nm (FWHM) allowing real-time instantaneous fiber loss and/or fiber loss variation testing and monitoring with negligible coherent speckle noise on the OTDR trace e.g., less or about 0.01 dB under a minimum averaging for examples ten (10) and even no averaging to have a response frequency up to 100 Hz to 1000 Hz, wherein an un-coherent laser OTDR can be either a spectrally broadband laser OTDR, for example, a spectrally broadband laser may broadband LED laser diode, or pulsed semiconductor optical amplifier (SOA) ASE lights, or broadband LED or ASE lights pulsed and amplified by a SOA or any optical modulator, or even to use swept wavelength (or fast tuned wavelength) laser OTDR, employed for the applications of fiber cables real-time instantaneous loss and fiber loss variation monitoring and fiber cable troubleshooting for the telecommunication fiber optical networks having a proximal end and a distal end.

Furthermore, in some embodiments of an un-coherent laser OTDR, real-time data acquisition may also use a quasi-continuous data sampling technique for commercially existed OTDR opto-electronics such as low-cost low performance ADC and FPGA can be directly used with minimum modification as well having much less acquired data such as about less than 10% to 90% in comparison to a real-time acquisition so that commercially available field industry computer or field platform can be used for the un-coherent laser OTDR signal processing and data saving but without any averaging i.e., real-time data acquisition, to acquire one group real time OTDR containing K no averaging real-time un-coherent laser OTDR traces as one group data, e.g. for K=64, then such group data acquisition is repeated for number N times with a time lapse, for example, ΔT=38 ms and N=1,250,00 for one day 24 hours real-time acoustic and vibration monitoring for a monitoring fiber length of 50 km as an example, for Δt=0.5 ms with a small time lapse between traces of 0.005 ms to have an acquisition time of 32.032 ms for acquiring 64 un-coherent laser OTDR traces. In such data aquation and data processing methods, a real-time instantaneous loss can be monitored in a maximum speed, e.g., only limited by a light pulse round-trip time of the monitored fiber cables.

It is noted that the above-described coherent laser OTDR (DAS) and un-coherent laser OTDR can have a long reach of 40 km to over 50 km even up to 100 km measurable or monitorable fiber cable length for using standard well developed commercially available OTDR electronics especially where a well-developed sensitive APD detector from an existed OTDR is directly used. It is also noted that without using any fiber amplifiers e.g., EDFA or fiber Raman amplifier the above-described coherent laser OTDR can still have a long reach to 50 km to up to 100 km measurable or monitorable fiber length for using standard well developed commercially available OTDR opto-electronics.

Implementations and Results:

OTDR is an optical measurement technique for optical fiber links where a test signal in the form of light pulses is launched in the optical fiber link under test and the return light signal, arising from backscattering and reflections along the link, is detected. Herein, the process of launching a test signal and acquiring the return light signal to obtain therefrom an OTDR trace is referred to as an "OTDR acquisition". The acquired power level of the return light signal as a function of time is referred to as an "OTDR trace" or a "reflectometric trace", where the time scale is representative of distance between the OTDR acquisition device and a point along the fiber link. Rayleigh scatter-based DAS acquisitions use coherent OTDR (C-OTDR) measurements wherein a coherent OTDR acquisition serves as a DAS acquisition and the acquired power level of the return light signal as a function of time is referred to as an "DAS trace".

In the following description, techniques that are generally known to one skilled in the art of OTDR and DAS measurement and DAS processing and analysis will not be explained or detailed and in this respect, the reader is referred to available literature in the art.

Each DAS acquisition is understood to refer to the actions of propagating a test signal comprising one or more coherent test light pulses having the same pulse width in the optical fiber link, and detecting corresponding return light signal from the optical fiber link as a function of time. A test light-pulse signal travelling along the optical fiber link will return towards its point of origin either through (distributed) backscattering or (localized) reflections. The acquired power level of the return light signal as a function of time is referred to as the DAS trace, where the time scale is representative of distance between the OTDR acquisition device and a point along the optical fiber link.

Figure 1B:
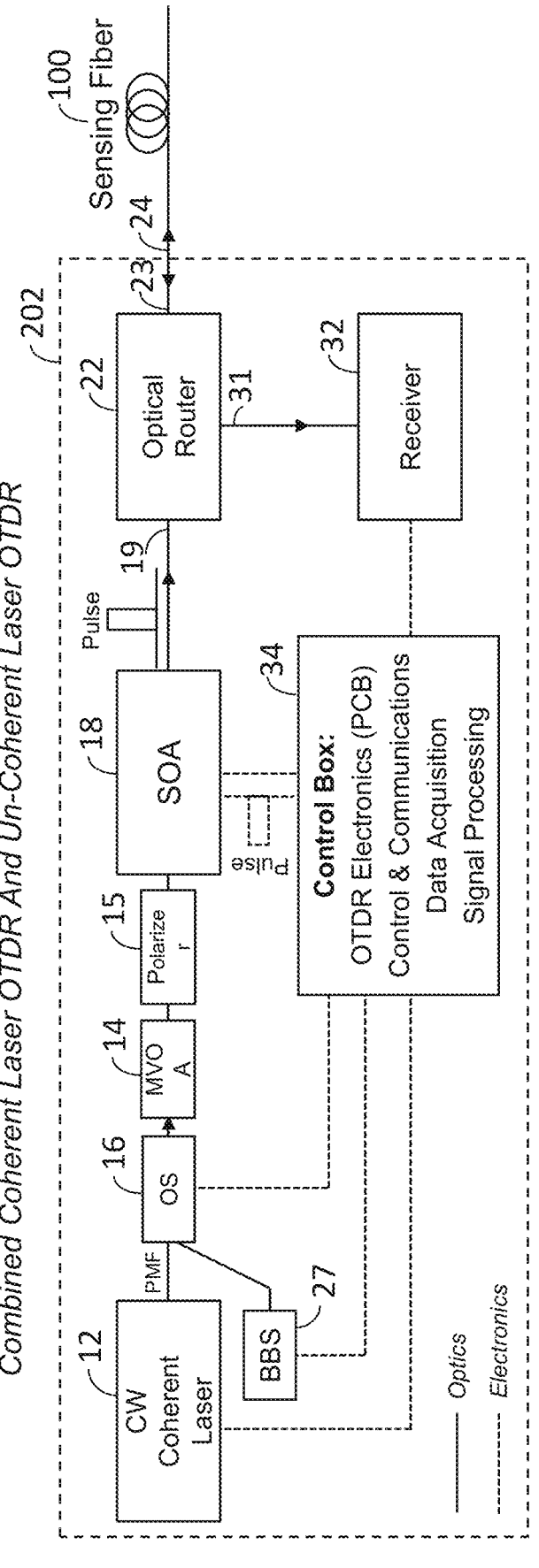
FIG. 1B is a block diagram illustrating another coherent laser OTDR based DAS acquisition apparatus which combines both coherent laser OTDR and un-coherent laser OTDR, where a commercially available OTDR opto-electronics is used.

Now referring to the drawings, FIG. 1A is a simplified schematic representation of coherent laser OTDR DAS acquisition apparatus 200 which combines a coherent laser OTDR (12, 18, 22, 32, 34) and un-coherent laser OTDR (18, 22, 32, 34). In a coherent OTDR mode of operation, a CW coherent laser 12 (also referred to herein as a coherent light source) is directly incident into a Semiconductor Optical Amplifier (SOA) 18 for the coherent laser OTDR data acquisition, wherein an input CW coherent laser power may be controlled by laser driven current or an integrated optical attenuator or similar technique. In an un-coherent OTDR mode of operation, the CW coherent laser 12 is simply turned off so a SOA 18 based OTDR can perform un-coherent laser OTDR (18, 22, 32, 34) data acquisition, wherein broadband light bandwidth is defined by SOA 18 ASE FWHM for example, typically about 30 to 50 nm. FIG. 1B illustrates another embodiment of a DAS design wherein in comparison to embodiment of FIG. 1A, a DAS acquisition apparatus 202 of FIG. 1B also combines a coherent laser OTDR (12, 14, 15, 16, 18, 22, 32, 34) and un-coherent laser OTDR (14, 15, 16, 18, 22, 27, 32, 34).

Above described DAS designs in FIG. 1A and FIG. 1B connect to a sensing optical fiber link 100 of an optical fiber network which may be monitored and tested according to implementations of the present method as schematically illustrated, according to different exemplary configurations. The optical fiber link 100 may be embodied by a portion of an optical fiber network which may be, e.g., a long-distance telecommunication network, a Passive Optical Network (PON) or a Local Area Network (LAN). It will be further understood by one skilled in the art that while the examples below are given within the simplified context of a single fiber link 100, embodiments of the present description may be adapted to point-to-multipoint networks, such as, e.g., Passive Optical Networks (PONs).

As illustrated in FIG. 1A and FIG. 1B, CW coherent laser 12 may comprise a low-noise laser with low phase noise and frequency noise and having a narrow laser linewidth. In the embodiment of FIG. 1A, the SOA 18 is not a polarization sensitive SOA but if, in other embodiments such as that of FIG. 1B, a polarization sensitive SOA is used, a polarization-maintaining optical fiber (PM fiber) may be used to connect CW coherent laser 12 and SOA 18. Optical router 22 can be either an optical circulator or fiber coupler such as 3 dB (50/50) coupler (or other split ratio). Receiver/detection module 32 typically comprises an Avalanche PhotoDiode (APD) light detector. Referring to FIG. 1B, an optic switch (OS) 16 is used to switch laser lights to any ports i.e., either let the CW coherent laser passing through or broadband light source (BBS) 27 passing through. The broadband light source (BBS) 27 may comprise a light emitting diode (LED) source or an Amplified Spontaneous Emission (ASE) light source from either 980 nm or 1480 nm laser diode pumped Erbium-doped fiber. MVOA 14 is a manually adjustable variable optical attenuator that adjusts an input laser power level to the SOA 18. Optionally, an in-line polarizer 15 may be used to provide a high polarization extinction ratio (PER) if SOA 18 is a polarization sensitive SOA, but if the SOA is not a polarization sensitive SOA then inline polarizer 15 is not required. It is worth noting that if the SOA 18 is a polarization sensitive SOA, then CW coherent laser 12, BBS 27, MVOA 14, inline polarizer 15 and OS 16 may need to be made with PM fibers. It is worth noting that an incident light power level from CW coherent laser 12 may be controlled by laser driven current or an integrated VOA inside laser module or any other suitable method.

Figure 2:
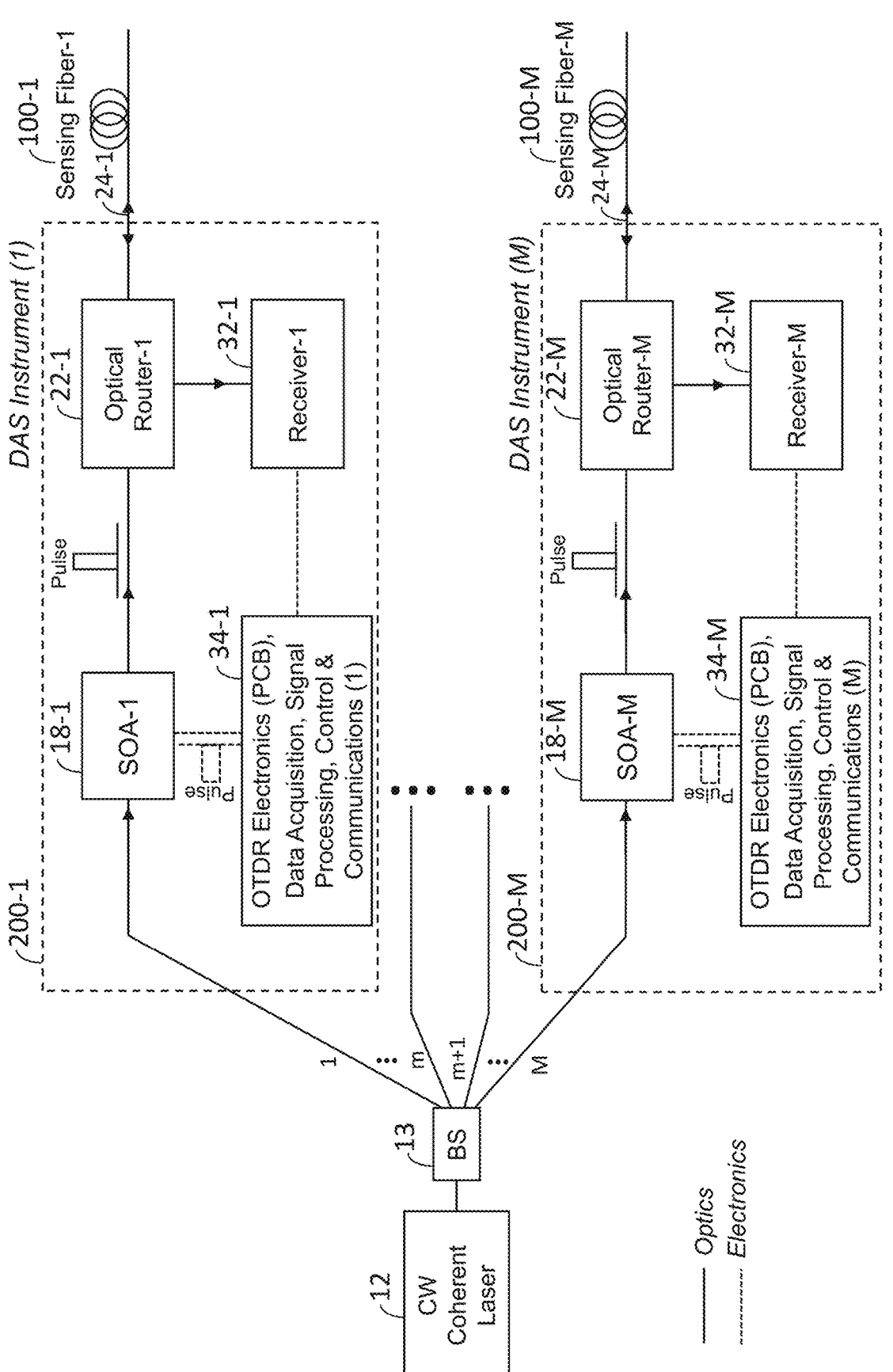
FIG. 2 is a block diagram illustrating a multi-channel coherent laser OTDR based DAS acquisition apparatus implementation sharing one CW coherent laser, where each channel DAS combines coherent laser OTDR and un-coherent laser OTDR using existing OTDR opto-electronics.

Now referring to FIG. 2, another embodiment of a DAS acquisition apparatus is illustrated which is a multi-channel DAS acquisition apparatus. It comprises M coherent laser OTDR DAS channels 200-1, . . . , 200-M sharing one CW coherent laser 12, where each channel 200-1, . . . , 200-M combines coherent laser OTDR and un-coherent laser OTDR using an existed OTDR opto-electronics, thereby the coherent laser OTDR DAS apparatus 200 illustrated in FIG. 1A may be designed to have M DAS channels 200-1, 200-2, . . . , 200-M by sharing one CW coherent laser 12, where each channel DAS 200-1, 200-2, . . . , 200-M has combined coherent laser OTDR and un-coherent laser OTDR using existing OTDR opto-electronics and M DAS channels 200-1, 200-2, . . . , 200-M may test or monitor several sensing optic fiber links 100-1, 100-2, . . . , 100-M simultaneously.

With reference to FIG. 1A, FIG. 1B and FIG. 2, the DAS acquisition apparatus 200, 202 or 200-1, 200-2, . . . , 200-M connects at the proximal end 24 or 24-1, 24-2, . . . , 24-M of the optical fiber link 100 or 100-1, 100-2, . . . , 100-M and is configured to perform a plurality of DAS acquisitions along the fiber link 100. The DAS acquisition apparatus 200, 202 or 200-1, 200-2, . . . , 200-M may be embodied by any assembly of components and devices to perform DAS acquisitions. In the illustrated embodiment, by way of example, the acquisition apparatus includes a light generating assembly that includes CW coherent laser 12, semiconductor optical amplifier (SOA) 18, and OTDR pulse generator electronics and control box 34 or 34-1, 34-2, . . . , 34-M, for example embodied by a CW coherent laser 12 driven by a CW stable constant current with temperature controller and a pulse generator and control box 34 or 34-1, 34-2, . . . , 34-M to generate current pulse to modulate SOA 18 or 18-1, 18-2, . . . , 18-M to generate coherent laser light pulses having the desired coherent light nature pulse characteristics that may be incident into sensing fiber 100 or 100-1, 100-2, . . . , 100-M via at the proximal end 24 or 24-1, 24-2, . . . , 24-M of the optical fiber link for detecting any acoustic or vibration DAS signal from the sensing fiber cable(s).

In some embodiments as shown in FIG. 1A, FIG. 1B and FIG. 2, the light generating assembly 12, 18 and 34 may be adapted to generate coherent light pulses having different pulse widths, for example through a proper control of the pattern produced by the pulse generator electronics and control box 34. Moreover, the light generating assembly 12, 18 and 34 is adapted to generate light pulses having different wavelengths, for example by varying laser current or temperature or the like. The coherent light generating assembly may also combine both pulse width and wavelength controlling capabilities. Of course, different and/or additional components may be provided in the coherent light generating assembly 12, 14, 15, 16, 18 and 34 as shown in FIG. 1B, such as in-line polarizer 15, isolator, modulators, and the like.

In the illustrated embodiments in FIG. 1A, FIG. 1B and FIG. 2, the coherent light pulse output from SOA 18 is coupled to the sensing optical fiber link 100 through an optical router 22 such as, for example, a circulator or a 50/50 coupler, having three or more branches 19, 23, 31. The first branch 19 is connected to the SOA 18 to receive the coherent laser light pulses therefrom, the optical router 22 outputting these pulses to the second branch 23 which is connected to the optical fiber link 100. The second branch 23 also receives the return light signals from the optical sensing fiber 100, which is circulated and outputted to the third branch 31. The third branch 31 is connected to an appropriate receiver/detecting module 32, for example an avalanche photodiode (APD), which detects the return coherent laser light signal for each test coherent light pulse.

In the illustrated embodiment, the detected signals are amplified by an electronic amplifier (not shown in FIG. 1A, FIG. 1B and FIG. 2 and then converted from analog to digital by a converter for the DAS signal processing in the FPGA then transferring acquired or processed DAS data to the host computer or similar, for example, field platform for test modules, for further signal processing with high level software.

As illustrated embodiment in FIG. 1B, an optical switch (OS) 16 switches CW coherent laser light passing through then incident the SOA 18 for the coherent laser OTDR (DAS) data acquisition. In fact, this optical switch (OS) 16 can also turn off CW coherent laser light and connect to a broadband source (BBS) 27 such as C-band ASE light source or polarized broadband light source (BBS) such as LED laser diode with a light bandwidth ranged from about 5 nm to about 30 nm, ASE or BBS light source or alternatively using optical bandpass filter (OBF) such as thin film filter or CDWM filter, for example, OBP may have a bandwidth 5 nm to 30 nm, then to a fiber mirror (M), or alternatively even using chirped fiber Bragg grating (CFPG) (CW coherent laser wavelength should not be within CFBG bandwidth (without using fiber mirror M and OBF)), to return partial of broadband incident lights from SOA's ASE lights back to the SOA to amplify them to have a high peak power within the CFBG bandwidth so to have returned broadband ASE light pulse to provide an un-coherent high-peak pulse laser that then incident into the same optical sensing fiber 100 (as similar as for the coherent laser OTDR acquisition) for an un-coherent laser OTDR (14, 15, 16, 18, 22, 27, 32, 34) or an un-coherent laser OTDR (18, 22, 32, 34) as shown in FIG. 1A for the data acquisition. It is also be noted that as for the embodiment in FIG. 1B, where the CW coherent laser 12 or BBS 27 light power level may be controlled by MVOA 14 to have a low enough weak incident light power into the SOA 18 to avoid any "live" fiber OTDR testing, i.e., requiring the SOA 18 has a switch ON/OFF light power ratio over 50 dB to 70 dB. To achieve this a MVOA 14 and an in-line polarizer 15 may be used to be inserted between the CW coherent laser 12 or BBS 27 and SOA 18.

The coherent laser OTDR DAS acquisition apparatus 200, 202 and 200-1, . . . , 200-M as illustrated embodiment in FIG. 1A, FIG. 1B and FIG. 2, respectively, may further includes a pulse generator and control box 34 having functions of pulse generation, control and communication, data acquisition and signal processing that is schematically and conceptually illustrated as a pulse generator and control box 34 as illustrated in the diagram of FIG. 1A, FIG. 1B and FIG. 2. The pulse generator and control box 34 may include one or more computer programs instructing the processor or processors to perform the method as described above and other operations of the DAS acquisition apparatus 200, 202, and 200-1, . . . , 200-M. In the illustrated variant, the pulse generator and control box 34 includes a coherent laser OTDR DAS data acquisition and signal processing module for acquiring then simultaneously processing the detected return light signals from the sensing optical fiber 100 in real-time mode. In the illustrated embodiments, the DAS data acquisition and signal processing inside a pulse generator and control box 34 integrates signal processing and trace analysis hardware and software. The pulse generator and control box 34 may be embodied by components such as ADC, FPGA or the like, software, and may also be integral or external to the DAS acquisition apparatus 200, 202 and 200-1, . . . , 200-M such as a host computer or platform based industrial computer. The pulse generator and control box 34 may perform real-time data acquisitions, data calculations and signal processing, necessary for monitoring or testing acoustic or vibration along the optical fiber link 100. The pulse generator and control box 34 may be also to control the acquisition conditions, for each light acquisition, for different data acquisitions using coherent laser OTDR, un-coherent laser OTDR, and coherent laser OTDR with laser frequency dithering, by controlling the light generating assembly including components and devices 12, 14, 15, 16, 18, and 27 as illustrated embodiment in FIG. 1B to generate desired test light pulses according to various acquisition conditions for the DAS data acquisition and un-coherent OTDR data acquisition.

The DAS acquisition apparatus 200, 202 and 200-1, . . . , 200-M of embodiments illustrated in FIG. 1A, FIG. 1B and FIG. 2 may be in some implementations that include an external memory, host computer data storing, cloud data storing, signal display, warning alarm, and the like in communication with inside a pulse generator and control box 34.

Figure 3A:
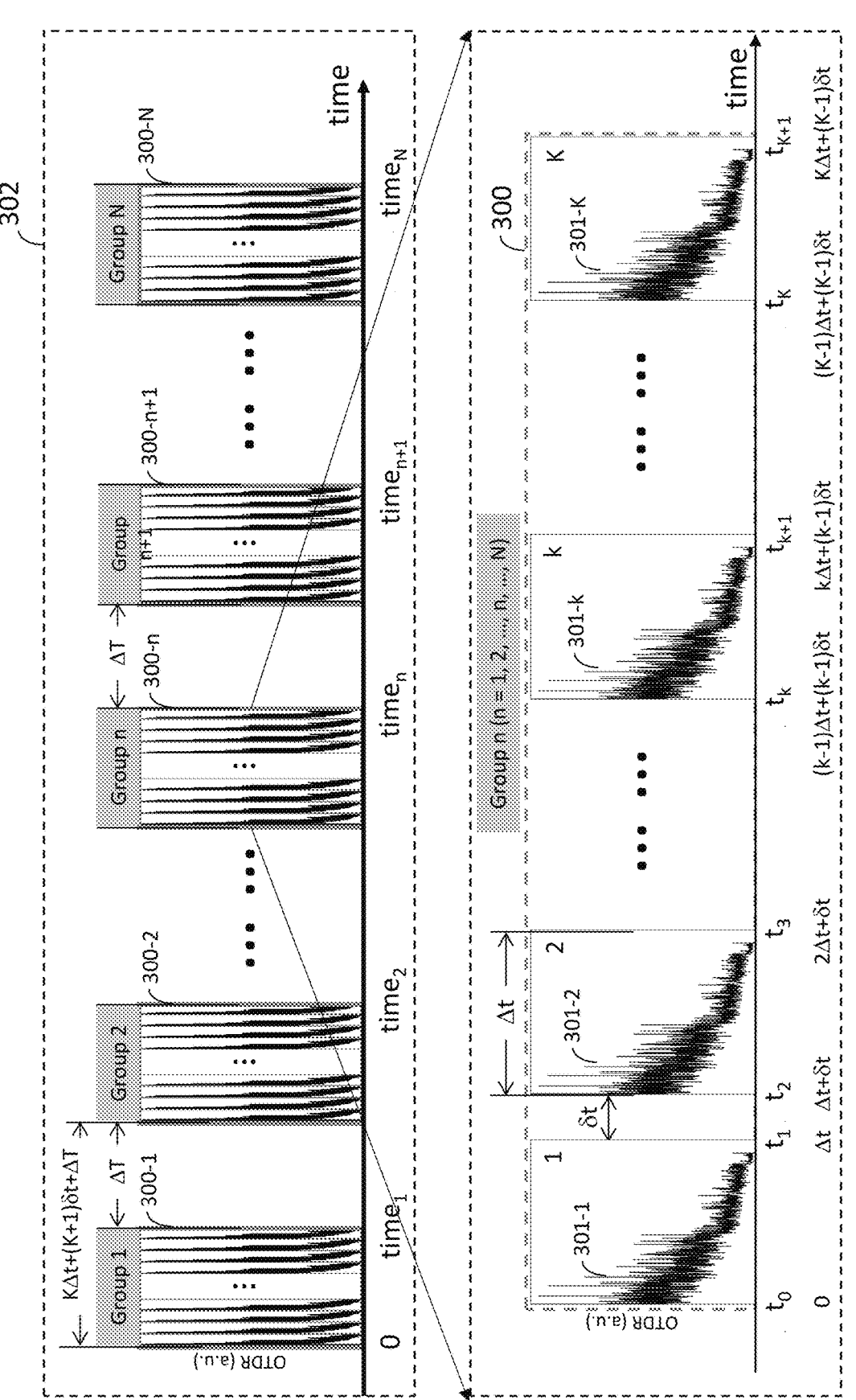
FIG. 3A comprises a top graph and a bottom graph wherein the top graph illustrates quasi-continuous data sampling and group data acquisition for quasi-continuous data group signal processing for many group OTDR data at different time, e.g., N data groups versus time, for either coherent laser OTDR or un-coherent laser OTDR according to embodiments of the invention; and the bottom graph illustrates one group data acquisition for the group n, i.e., $n^{th}$ data group for signal processing for one group DAS data, e.g., containing K OTDR traces, for either coherent laser OTDR or un-coherent laser OTDR.
Figure 3B:
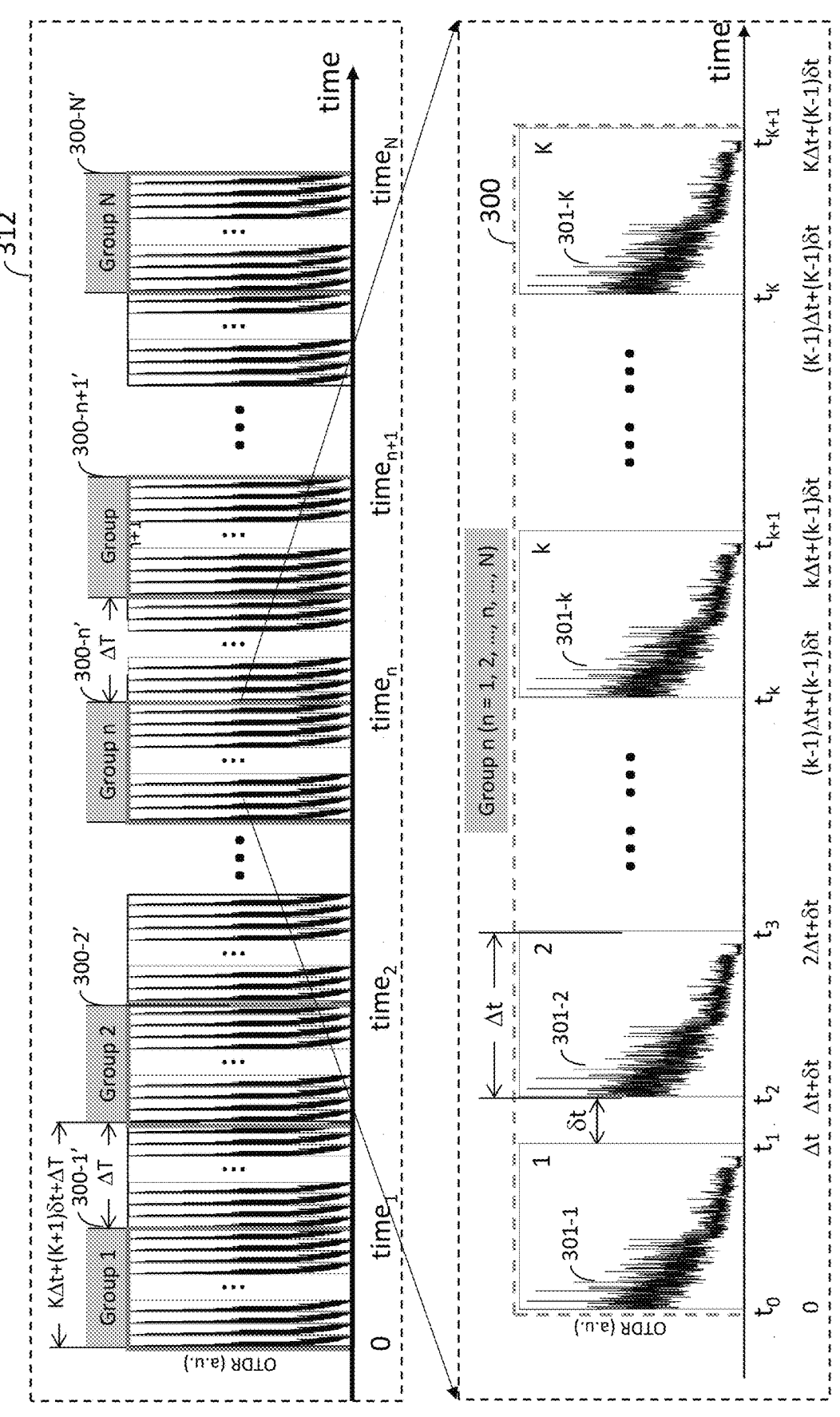
FIG. 3B comprises a top graph and a bottom graph wherein the top graph illustrates continuous data sampling and group data acquisition but for quasi-continuous data group signal processing for selected many group OTDR data, e.g., N data groups, for either coherent laser OTDR or un-coherent laser OTDR according to embodiments of the invention; and the bottom graph illustrates one group data acquisition for the group n i.e., $n^{th}$ data group for signal processing for one group DAS data, e.g., containing K OTDR traces, for either coherent laser OTDR or un-coherent laser OTDR.

With reference to FIG. 3A and FIG. 3B, there is shown an implementation of low-cost field fiber optic DAS interrogator which may use commercially available OTDR and which uses quasi-continuous and continuous data sampling and group data based data acquisition technique. Illustrated embodiment in FIG. 3A 302 and FIG. 3B 312, respectively, illustrate the data acquisition for one group OTDR data 300 for either coherent laser OTDR data acquisition or un-coherent laser OTDR data acquisition and data acquisition for many group OTDR data 302 or 312 for either coherent laser OTDR or un-coherent laser OTDR, respectively. FIG. 3A illustrates quasi-continuous data sampling and group data acquisition for quasi-continuous group signal processing for many group OTDR data at different time, e.g., N data groups versus time, for either coherent laser OTDR or un-coherent laser OTDR. FIG. 3B illustrates continuous data sampling and group data acquisition but for quasi-continuous group signal processing for selected many group OTDR data, e.g., N data groups, for either coherent laser OTDR or un-coherent laser OTDR.

The above described implementations are the method and apparatus of low-cost field fiber optic DAS interrogator for using commercially available OTDR opto-electronics such as low-cost low performance ADC and FPGA can be directly used with minimum modification (development) as well having much less acquired data such as about 10% to 90% or any percentage in comparison to a real-time acquisition so that commercially available field industry computer or field platform can be used for the DAS signal processing and data saving. For example, using conventional OTDR data acquisition such as made in, e.g., U.S. Pat. No. 9,170, 149 B2 but without any averaging i.e., real-time data acquisition, to acquire one group of real time OTDR traces as shown in box 300 for K no averaging or averaging one real-time coherent laser OTDR traces 300-1, 300-2, . . . 300-k, . . . , 300-K that are illustrated in FIGS. 3A and 3B as one group data, e.g. for K=64. Then such group data acquisition as illustrated in box 300 in FIGS. 3A and 3B is repeated for N times with a time lapse ΔT as shown in box 302 or 312 for quasi-continuous data sampling 302 or continuous data sampling 312, respectively, e.g., ΔT=38 ms and N=1,250,00 for one day of 24 hours real-time DAS monitoring for a monitoring fiber length of 40 km up to 50 km as an example, for Δt=0.5 ms with a small time lapse between traces of 0.005 ms to have an acquisition time of 32.032 ms for acquiring 64 DAS traces. It should be noted that group data acquisitions as shown in box 302 in FIG. 3 for acquiring N data groups 300-1, 300-2, . . . , 300-n, . . . , 300-N is from quasi-continuous data sampling 302, while group data acquisitions as shown in box 312 in FIG. 3(A) for acquiring N data groups is from continuous data sampling 312 where the data is continuously sampled but only to acquire then save N data groups in time slots as shown in box 312 for data groups 300-1', 300-2', . . . , 300-n', . . . , 300-N'.

Figure 4:
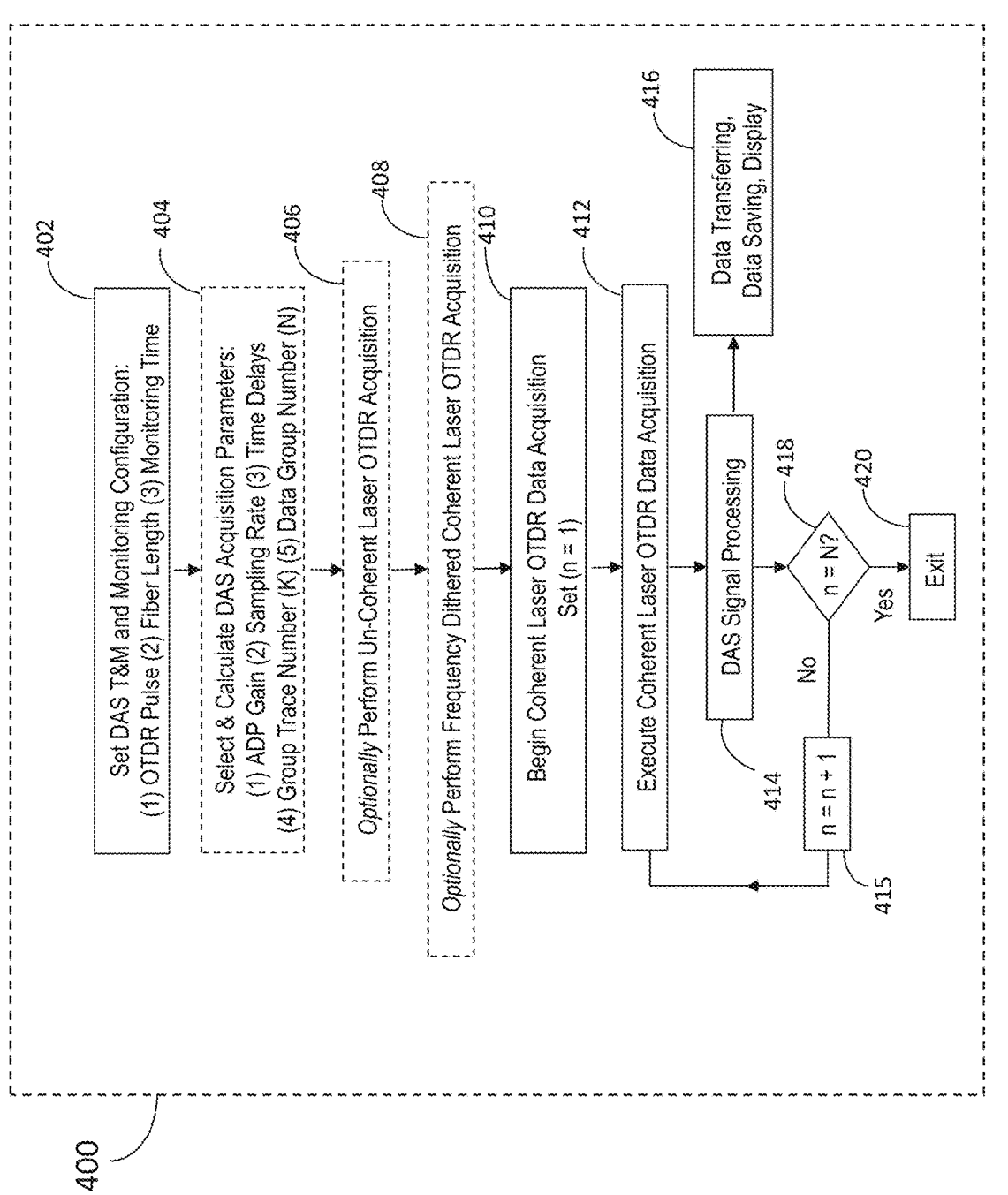
FIG. 4 is a flow chart illustrating a method according to implementations in FIGS. 1A, 1B, 2, 3A and 3B.

With reference to FIGS. 1A, 1B, 2, 3A and 3B, Some Embodiments of Low-Cost field fiber optic DAS interrogator may also include to use low-cost low-resolution/low bits dada sampling for the DAS data acquisition module 34 and 34-1, . . . , 34-M as illustrated embodiment in FIGS. 1A, 1B and 2, receptively, so that commercially existing OTDR opto-electronics with low-cost low bits digitizer (ADC and FPGA) in pulse generator and control box 34 can be directly applied with minimum development effort. Then DAS interrogator data acquisition as illustrated in FIG. 4 flowchart 400 can be directly used but still having an enough DAS acoustic or vibration detection sensitivity for the applications such as for fiber cables monitoring, fiber cable route data collection, and fiber cable troubleshooting for fast to locate fiber cable broken point for the telecommunication fiber optics networks. It is worth noting that the lower bit is the digitizer (ADC and FPGA), then the less is sensitive is the DAS acoustic or vibration detection.

With reference to FIGS. 3A 302 and 3B 312, there is illustrated the method and apparatus of low-cost field fiber optic DAS interrogator using independent group data signal processing for data acquired from independent group data acquisition with either quasi-continuous sampling mode or continuous sampling mode. In one embodiment, the method of independent group data signal processing uses acquired group data 300 in 302 or 312 from group data acquisition where one group data 300 contains K=64 traces 310-1, 310-2, . . . , 310-K, where each coherent laser OTDR trace acquisition time Δt=ms with time lapse between every two coherent laser OTDR traces of 0.005 ms for 40 km up to 50 km optical fiber test and monitoring, from quasi-continuous or continuous data sampling method with a time lapse between each two group data for ΔT, for example, ΔT=37.995 ms.

Advantageously, independent group data acquisition then independent group data signal processing leads DAS interrogator more robust and reliable for the field applications. This is because the DAS method described herein reduces requirement for the laser frequency or laser phase stability or can use a slightly wider linewidth laser with slightly more laser phase or frequency noise such as low-noise DFB laser with laser linewidth of about 10 to 100 kHz.

With reference to FIGS. 3A 302 and 3B 312, there is illustrated a method of quasi-continuous or continuous sampled independent data group data acquisition and independent data group signal processing for coherent laser OTDR based fiber optic DAS interrogator also includes the following steps for the data group-based data acquisition and signal processing as shown in the flowchart of FIG. 4.

As illustrated in FIG. 4 the flowchart 400 provides independent data group-based DAS data acquisition using coherent laser OTDR. It is an option to perform un-coherent laser OTDR data acquisition (step 406) and an option to perform coherent laser OTDR data acquisition with dithering the laser frequency (step 408).

In step 402, the instrument sets DAS acquisition configuration by either default or using manually setting for example pulse length, fiber length (so having a coherent laser OTDR acquisition time $\Delta t$ defined as two times fiber length divided by a light speed in the fiber), monitoring or measurement time, data sampling mode i.e., quasi-continuous or continuous sampling, data acquisition mode either for a long time fiber cable or fiber network monitoring or for a short time period for the fiber test & measurement and troubleshooting. In step 404, the instrument also automatically calculates or sets/selects other coherent laser OTDR DAS acquisition parameters, for example APD gain, sampling rate, time lapse $\delta t$ (between coherent laser OTDR traces), group trace number (K), group data time lapse $\Delta T$ between any two neighbor data groups, and number N of traces in one group that may be calculated from user set or selected monitoring or measurement time for example as illustrated embodiment in FIGS. 3A 302 and 3B 312 but not limited.

In step 406, optionally, the instrument may perform an un-coherent laser OTDR DAS data acquisition but uses the same data acquisition configuration and data acquisition parameters for coherent laser OTDR by using an un-coherent laser OTDR apparatus as illustrated embodiment in FIG. 1B (14, 15, 16, 18, 22, 27, 32, 34) and operates under said un-coherent laser OTDR acquisition conditions by launching series of incoherent laser OTDR pulses, thereby obtains at least one reflectometric trace ideally many reflectometric traces representing a proximal portion of the optical fiber.

It is worth noting that there are some noises on the real-time un-coherent laser OTDR traces that may be caused by low sampling resolution e.g., low bit ADC, sampling noise, residual laser phase noise e.g., coherent speckle noise, and detection electronics noise, etc. As explained hereinabove (in section MEASUREMENT PRINCIPLES), the un-coherent laser OTDR DAS data acquisition may be used in processing to extract such instrument system offset and obtain a normalization trace.

In step 408, optionally, the instrument performs a coherent laser OTDR DAS (see FIG. 1(A) 12, 14, 15, 16, 18, 22, 32, 34) data acquisition under dithering the laser frequency 408 as illustrated embodiment in the flowchart in FIG. 4 by either dithering laser operation current or varying laser temperature by laser temperature control but using the same acquisition setting parameters for the coherent laser OTDR data acquisition configuration and acquisition parameters using an OTDR apparatus connected at the proximal end of the optical fiber and operates under said coherent laser OTDR acquisition conditions by launching series of coherent laser OTDR pulses, thereby obtaining at least one reflectometric trace but ideally many reflectometric traces representing a proximal portion of the optical fiber link. From many dithered laser frequency coherent laser OTDR traces, a coherent laser OTDR trace variance can be computed then obtained e.g., to compute their root-mean-square (RMS) difference.

As explained hereinabove (in section MEASUREMENT PRINCIPLES), the coherent laser OTDR DAS data acquisition under dithering may be used in processing to obtain a normalization trace vs distance z.

The instrument initializes coherent laser OTDR DAS data acquisition loop 410 as illustrated in the flowchart in FIG. 4 for acquiring total N groups of reflectometric traces, each group containing K reflectometric traces with a group data time lapse $\Delta T$ between any two neighbor data groups and selecting or user defining data acquisition mode, i.e., either quasi-continuous or continuous sampling mode as shown in FIGS. 3A and 3B.

In step 412, for group n (starting with n=1), the instrument performs a coherent laser OTDR DAS independent data group-based data acquisition along the fiber cable using a coherent laser OTDR apparatus as illustrated embodiment in FIG. 1 (12, 18, 22, 32, 34) or as illustrated embodiment in FIG. 1(A) (12, 14, 15, 16, 18, 22, 32, 34) connected at the proximal end of the optical fiber cable and operates under said coherent laser OTDR (DAS) acquisition conditions by launching series of coherent laser OTDR pulses, to obtain a group of DAS reflectometric traces where each data group containing K=64 traces represents a proximal portion of the optical fiber cable as shown in FIGS. 5A 506-1 and 506-2.

Figure 5A:
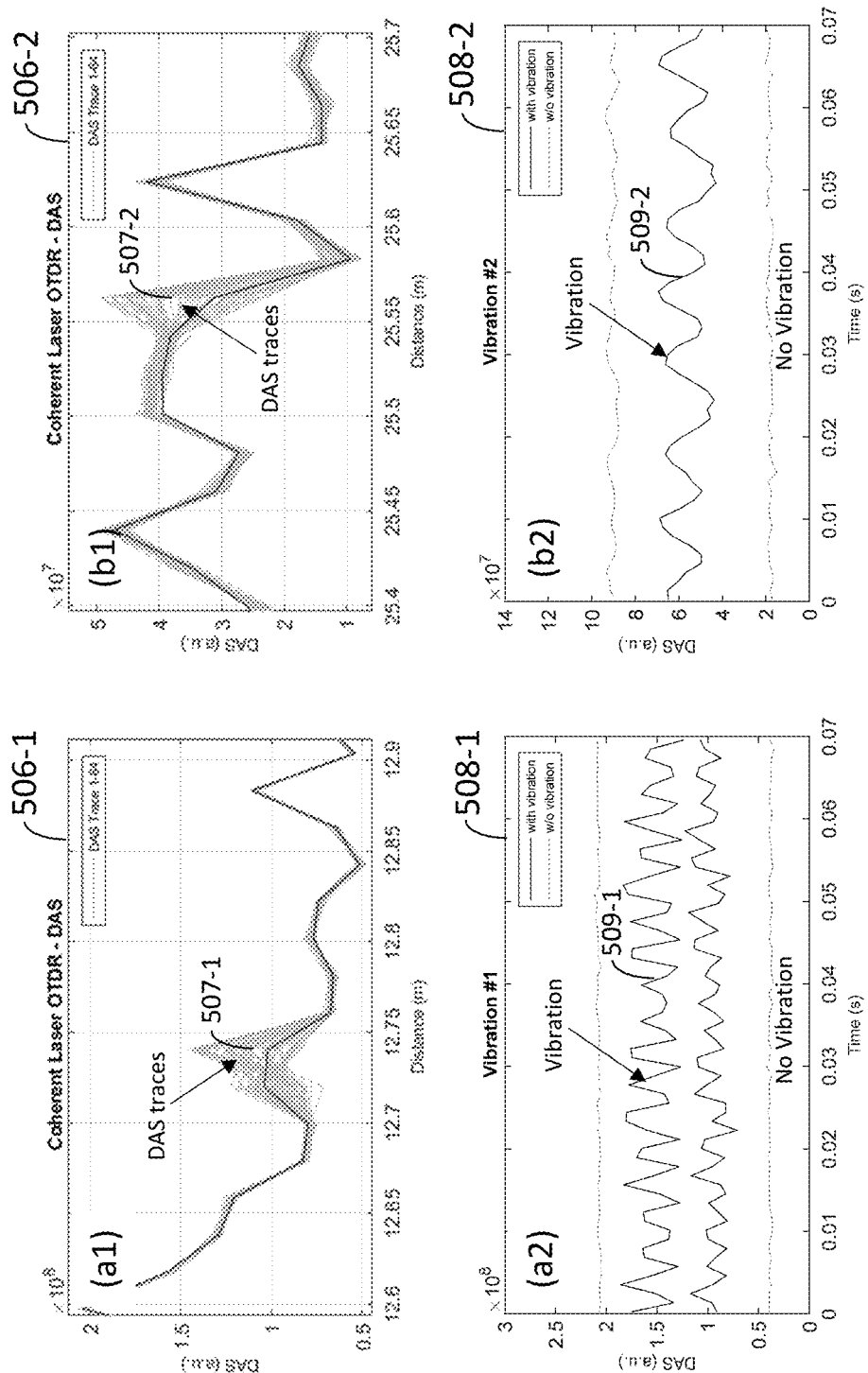
FIG. 5A comprises graphs (a1), (a2), (b1) and (b2) wherein (a1) and (b1) are exemplary coherent laser OTDR reflectometric traces for one group data and (a2) and (b2) are exemplary extracted vibration signals from coherent laser OTDR reflectometric traces of (a1) and (b1) for two fiber stretchers which were connected to sensing optic fiber cable at locations of 12.75 km and 25.55 km, respectively.

It is worth noting that FIG. 5A (a1) 506-1 and (b1) 506-2 are exemplary coherent laser OTDR reflectometric traces, i.e., DAS traces from coherent laser OTDR data acquisitions and FIG. 5A (a2) 508-1 and (b2) 508-2 are exemplary extracted vibration signals from measured coherent laser OTDR reflectometric traces of (a1) 507-1 and (b1) 507-2 for two fiber stretchers which were connected to sensing optic fiber cable at locations of 12.75 km and 25.55 km, respectively, for total 64 DAS traces, according to one example. As shown in FIG. 5A (a1) 507-1 and (b1) 507-2, variations versus time of the coherent laser OTDR DAS traces' amplitudes at locations of 12.75 km and 25.55 km, respectively, are displayed in FIG. 5A (a2) 509-1 and (b2) 509-2. Those variations of DAS trace's amplitudes are due to two fiber stretchers modulating the fiber lengths to produce simulated vibration signals on the sensing fiber cable.

In step 414, for group n, the instrument performs independent data group-based DAS signal processing by using above acquired data group(s) from coherent laser OTDR DAS as well optionally by using above acquired data group(s) from un-coherent laser OTDR and acquired data group(s) from coherent laser OTDR under dithering laser frequency. The instrument performs signal processing method as such described above in section MEASUREMENT PRINCIPLES for steps 1, 2, 3, 4 and 5 or 1, 2, 3', 4' and 5', where optionally using un-coherent laser OTDR traces and optionally using coherent laser OTD traces with dithering the laser frequency.

In step 416, processed data may be transferred and/or saved and DAS signal may be displayed to the user.

In steps 415, 418 and 420, previous steps 412, 414 and 416 are repeated for each group n up to n=N.

Figure 5B:
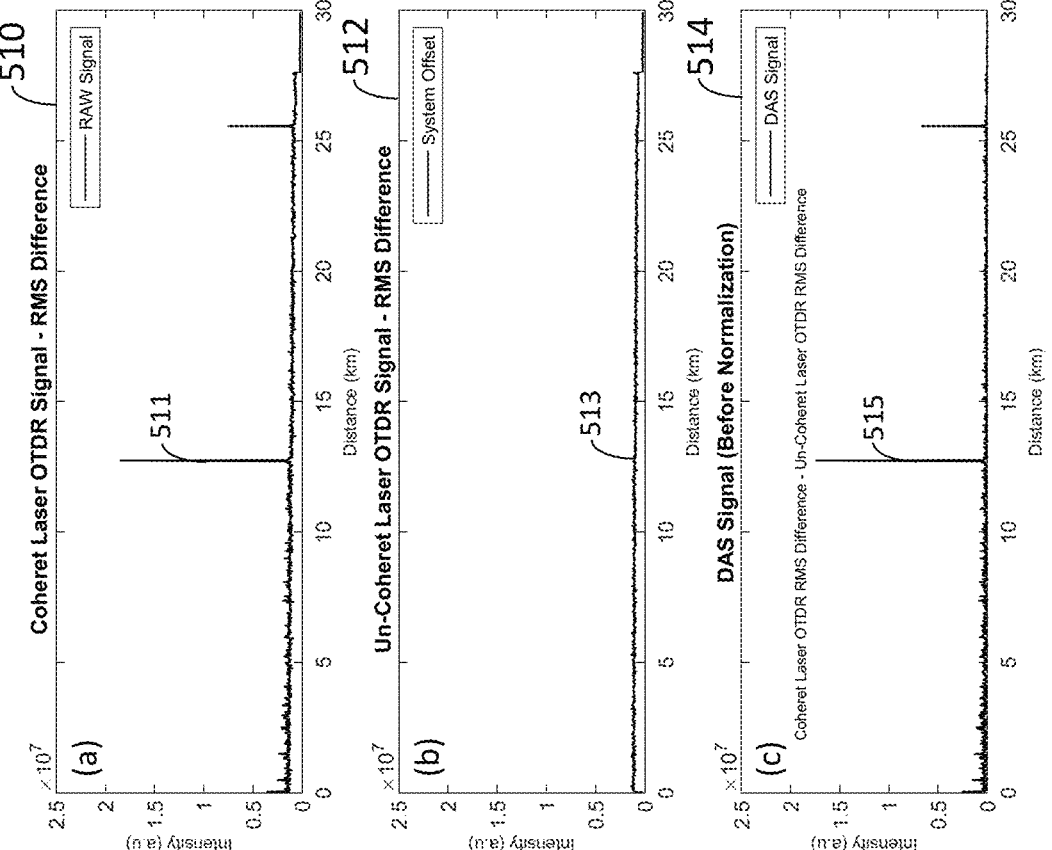
FIG. 5B comprises graphs (a), (b) and (c), wherein (a) is exemplary computed DAS root-mean-square (RMS) signal trace from FIG. 5A coherent laser OTDR reflectometric traces according to one implementation; (b) is exemplary computed instrument system offset error trace that can be either extracted from acquired reflectometric traces from an un-coherent laser OTDR data acquisition or extracted from coherent laser OTDR traces by digitally filtering those coherent signals according to one implementation; (c) is exemplary computed DAS signal trace after computing DAS signal trace as illustrated in FIG. 5B (a) subtracting a computed instrument system offset error trace of FIG. 5B (b).
Figure 5C:
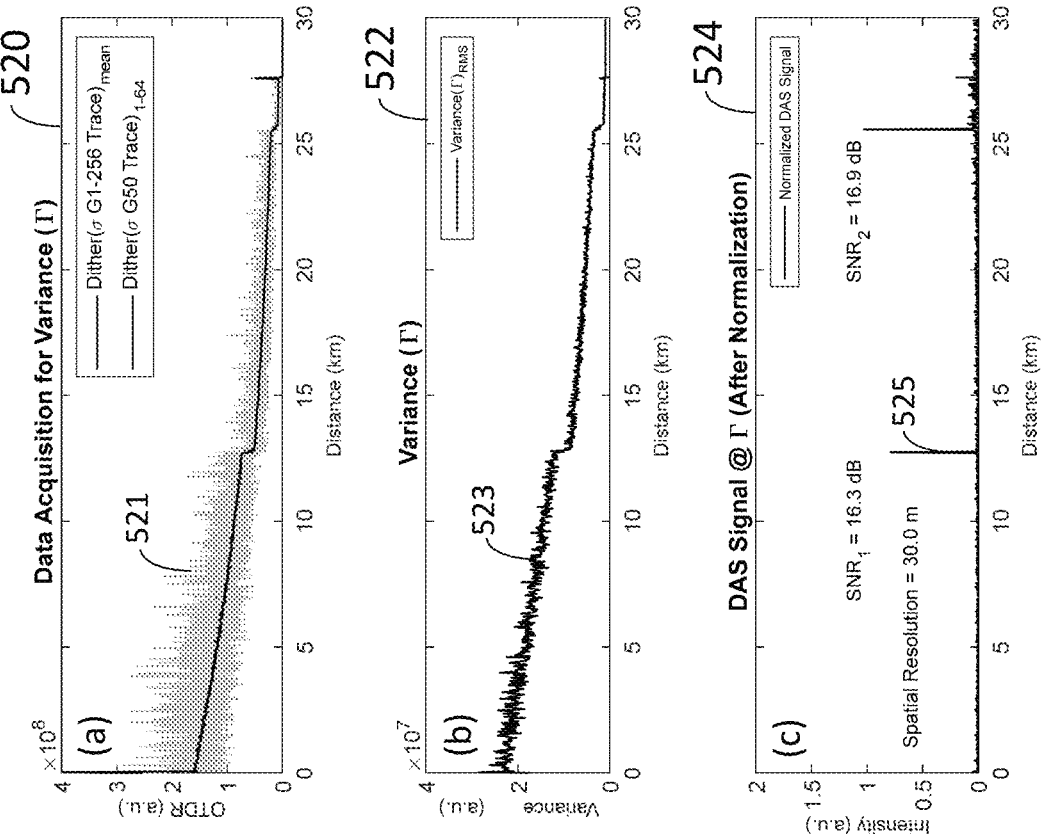
FIG. 5C comprises graphs (a), (b) and (c), wherein (a) shows exemplary reflectometric traces from a coherent laser OTDR with dithering laser frequency; (b) is exemplary of calculated DAS normalization ($\Gamma(z)$) trace using acquired reflectometric traces of (a); and (c) is exemplary computed final DAS signal trace from DAS signal trace of FIG. 5B (c) dividing a DAS normalization ($\Gamma(z)$) trace of FIG. 5C (b).

FIG. 5B (a) is exemplary computed DAS root-mean-square (RMS) signal trace from FIG. 5A coherent laser OTDR reflectometric traces 506 according to one example. FIG. 5B (b) is exemplary computed instrument system offset error trace that can be either optionally extracted from acquired reflectometric traces from an un-coherent laser OTDR data acquisition or optionally extracted from coherent laser OTDR traces by digitally filtering those coherent signals. FIG. 5C (c) is exemplary computed DAS signal trace after computed DAS root-mean-square (RMS) signal trace 511 subtracting a computed instrument system offset error trace 513.

FIG. 5C (a) are exemplary reflectometric traces from a coherent laser OTDR with dithering laser frequency. FIG. 5C (b) is exemplary of calculated DAS normalization trace F(z) using acquired reflectometric traces from a coherent laser OTDR with dithering laser frequency. FIG. 5C (c) is exemplary computed final DAS signal trace from DAS signal trace as illustrated in FIG. 5B (c) dividing a DAS normalization trace F(z) as illustrated in FIG. 5D (b).

Figure 5D:
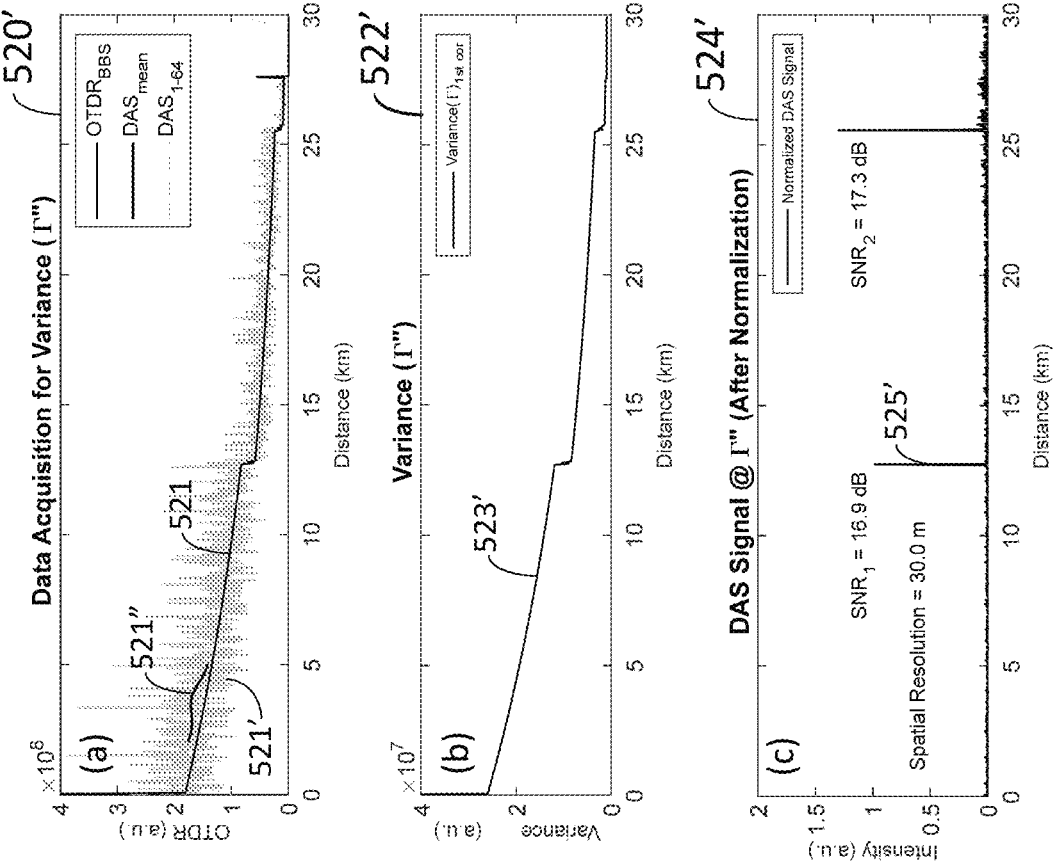
FIG. 5D comprises graphs (a), (b) and (c), wherein (a) shows exemplary reflectometric traces from a coherent laser OTDR without any dithering on the laser frequency; (b) are exemplary of calculated DAS normalization ($\Gamma''(z)$) trace using acquired reflectometric traces from a coherent laser OTDR without any dithering on the laser frequency of FIG. 5D (a); and (c) is exemplary computed final DAS signal trace from DAS signal trace of FIG. 5B (c) dividing to a DAS normalization ($\Gamma''(z)$) trace as illustrated in FIG. 5D (b).

Alternatively, FIG. 5D (a) are exemplary reflectometric traces from a coherent laser OTDR without any dithering on the laser frequency. FIG. 5D (b) is exemplary of calculated DAS normalization trace $\Gamma'''(z)$ using acquired reflectometric traces from a coherent laser OTDR without any dithering on the laser frequency such as illustrated in FIG. 5D (a). FIG. 5D (c) is exemplary computed final DAS signal trace from DAS signal trace as illustrated in FIG. 5B (c) dividing to a DAS normalization trace $\Gamma'''(z)$ as illustrated in FIG. 5D (b).

Figure 5E:
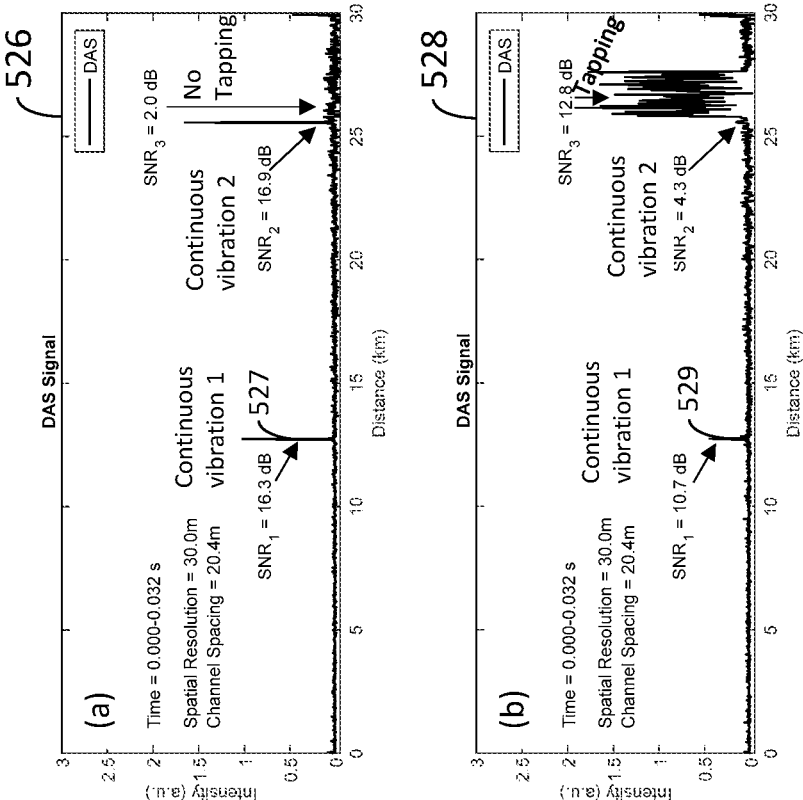
FIG. 5E comprises graphs (a) and (b) which are examples of computed final DAS signal traces from one group data DAS traces i.e., K=64 coherent laser OTDR reflectometric traces, where (a) is without any tapping vibration but (b) has tapping vibration after 25.8 km for over 2 km.

FIG. 5E (a) and (b) are examples of computed final DAS signal traces vs fiber distance from one group data DAS traces i.e., K=64 coherent laser OTDR reflectometric traces, where FIG. 5E (a) is without any tapping vibration but FIG. 5E (b) has tapping vibration after 25.8 km for over 2 km.

Figure 6A:
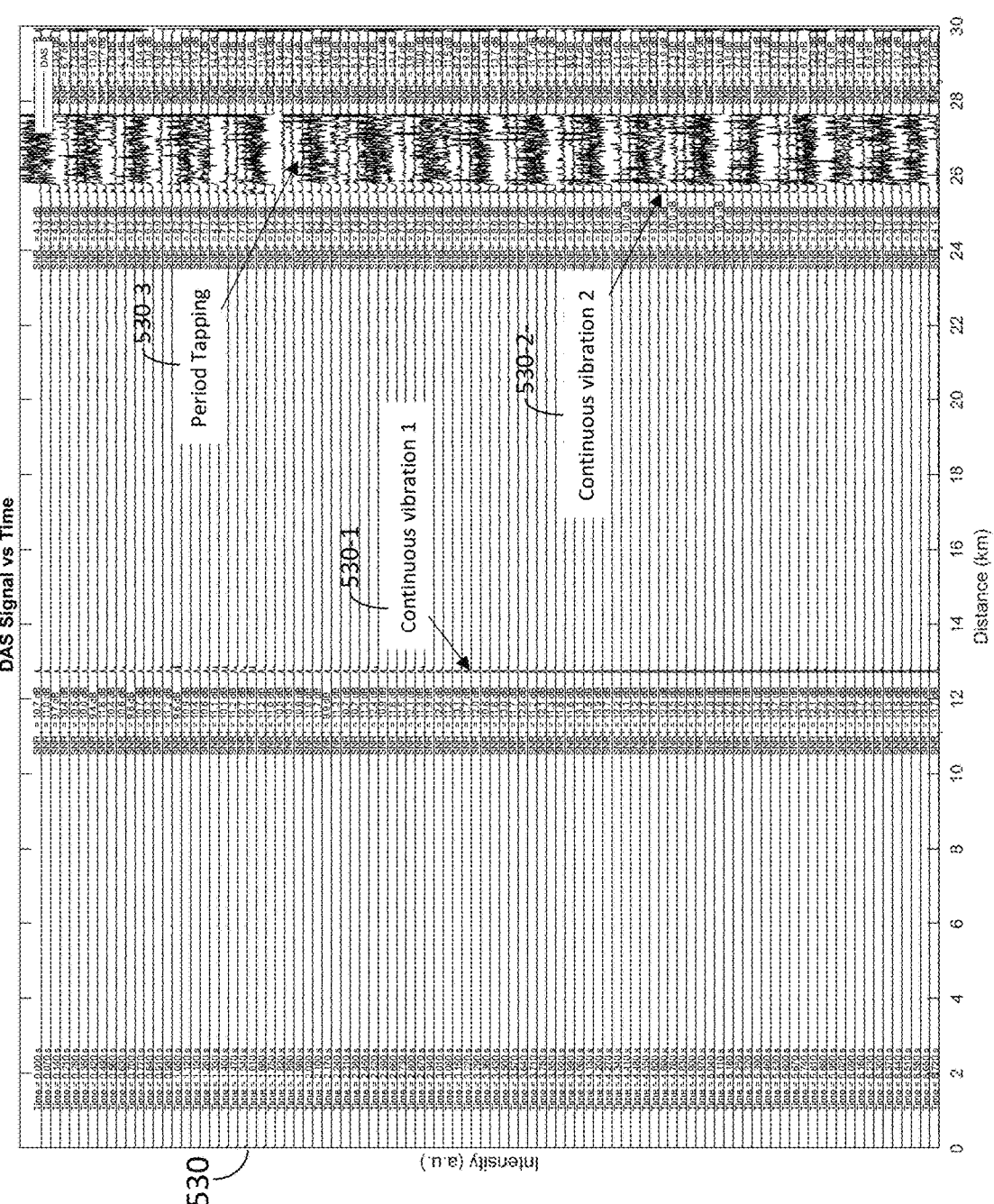
FIG. 6A are exemplary computed final DAS signal traces for acquired N=97 DAS data groups for a total time-period of about 6.7 seconds with two fiber stretchers connected to sensing optic fiber cable at locations of 12.75 km and 25.55 km, respectively, and with tapping vibration after 25.8 km for over 2 km optic fiber.

As illustrated in FIG. 6A, the instrument repeatedly performs a coherent laser OTDR DAS independent data group-based data acquisition then repeatedly performs independent data group-based DAS signal processing for N times. For example, obtaining 1st to N$^{th}$ data group e.g., N=1,250,000 for about one day time or any number that is calculated from a total measurement or monitoring time with a time lapse $\Delta T$ between any two neighbor groups, as such as it is not limited e.g. as such as a time lapse $\Delta T$ between any two neighbor groups may be varied for any time lapse that may be user defined such as in the data acquisition control software, where each data group contains K DAS traces, e.g., K=64 or any number that should be not limited as any number or even with different DAS traces for different data group that may be defined such as in the data acquisition control software, and DAS reflectometric traces representing a proximal portion of the optical fiber link. Coherent laser OTDR signal processing is performed N times as such as described above for the 1$^{st}$ to N$^{th}$ data group each data group containing K DAS reflectometric traces, i.e., performing DAS data group based signal processing for the same steps 1), 2), 3), 4) and 5) or 1), 2), 3'), 4') and 5') for the 1st to N$^{th}$ data group DAS reflectometric traces as such as an example computed results shown in FIG. 6A for N=97.

Figure 6B:
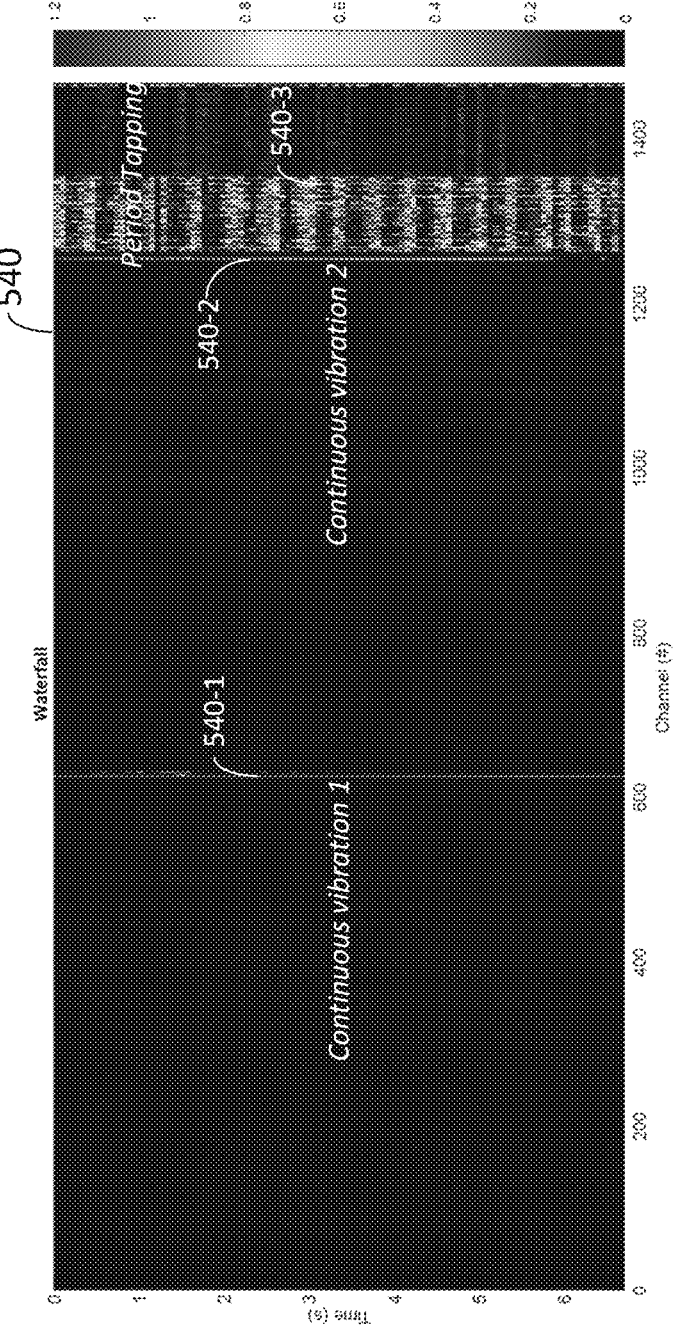
FIG. 6B is exemplary final computed DAS signals that are displayed in waterfall format for acquired N=97 DAS data groups for a total time period of about 6.7 seconds as for the DAS final computed signals as such illustrated in FIG. 6A with two fiber stretchers connected to sensing optic fiber cable at locations of 12.75 km and 25.55 km, respectively and with tapping vibration after 25.8 km for over 2 km optic fiber length.
Figures 6C, 6D:
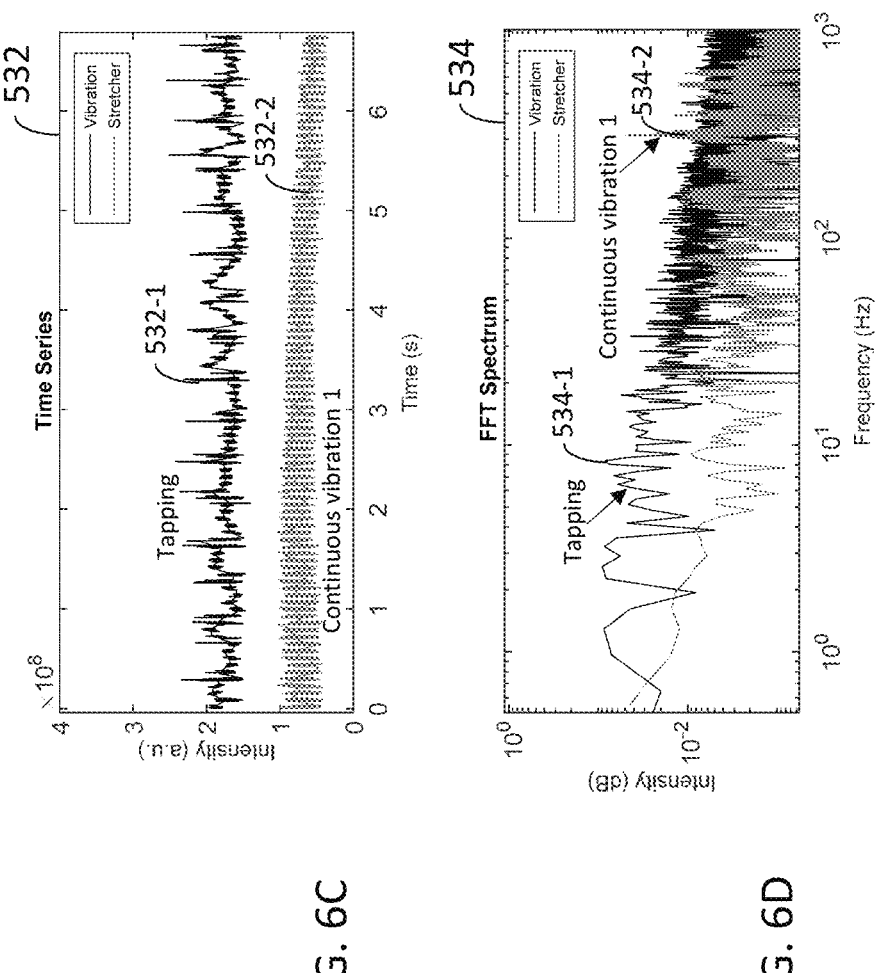
FIG. 6C is a graph showing exemplary time series of final computed DAS vibration signals for one fiber stretcher connected to sensing optic fiber cable at a location of 12.75 km and for tapping vibration after 25.8 km, respectively
FIG. 6D is a graph showing exemplary FFT spectra for computed DAS vibration signals' time series as such illustrated in FIG. 6C.

As illustrated in FIG. 6B, generally the instrument may display a waterfall for the DAS computation results vs fiber distance or DAS channel number (#) using processed N (N=97) data groups DAS traces' processed results in time domain, where a channel spacing may be a sampling spatial resolution, e.g., 20.4 m. Also as illustrated in FIG. 6C and FIG. 6D, the instrument may display processed N (N=97) data group DAS signal in time domain i.e., time series as such shown in 532-1 and 532-2 for the tapping vibration and fiber stretcher modulation signal, respectively, and may display processed N (N=97) data group DAS signal that are processed results in frequency domain (FFT spectrum) after the fast Fourier transform (FFT) computation as such shown in 534-1 and 534-2 for the tapping vibration and fiber stretcher modulation signal, respectively.

In some embodiments, the method and apparatus of low-cost field fiber optic coherent laser OTDR based DAS interrogator may allow to design several DAS acquisition channels by sharing one low-noise laser such as having 2, 4, 8 and 16 DAS channels for simultaneously fiber security monitoring application for example using one light beam splitter (BS) 13 in FIG. 2 to split low-noise laser to M ports e.g., M=2, 4, 8 and 16 fiber output ports then incident into several SOAs 18-1, . . . , 18-M as illustrated embodiment in FIG. 2 so to lead further instrument cost reduction.

Some embodiments of the method and apparatus of low-cost field fiber optic coherent laser OTDR based DAS interrogator may also comprise the following features:

1) typically using 100 ns OTDR pulse for the DAS measurements but allowing use much longer OTDR pulse such as from 50 ns up to 5 us pulse so as to measure or monitor long sensing fiber cable from 10-50 km up to over 100 km, 2) using a semiconductor optical amplifier (SOA) as both light modulator and optical amplifier to launch high peak power of OTDR pulse to sensing fiber. Furthermore, the SOA typically is driven in pulse mode for a factor of 2 or 3 times higher current than that of a CW SOA current so to have a OTDR pulse peak power of 17 dBm to 23 dBm to avoid using any fiber optical amplifier and optical bandpass filter, etc., 3) setting a commercially available OTDR detection (APD) electronics having a low detection bandwidth of 1 MHz to 10 MHz to have a high detection sensitivity of −65 dBm to −70 dBm for monitoring or measuring long optic fiber cable e.g., over 40 to 50 km, 4) because of above both aspects of 1) and 2) so to avoid using any fiber optical amplifier such as EDFA or fiber Raman amplifier so that fiber nonlinear effects such as Stimulated Brillouin Scattering (SBS) and Modulation Instability (MI) are significantly reduced or avoided.

As illustrated in FIG. 1A, a coherent laser OTDR apparatus 200 is combined with coherent laser OTDR (12, 18, 22, 32, 34) e.g., when the CW coherent laser 12 is turned on, and an un-coherent laser OTDR (18, 22, 32, 34) e.g., when CW coherent laser 12 is turned off, wherein commercially available OTDR opto-electronics may be used. As illustrated in FIG. 1B an un-coherent laser OTDR DAS acquisition apparatus 202 may also be combined with a broadband light source (BBS) 27. In accordance with an un-coherent laser OTDR apparatus which may also be combined with a tunable laser or frequency swept laser (not shown). It should be noted that tunable laser wavelength/frequency may be controlled by a mean of a fast wavelength sweeping for example >1,000 nm to 100,000 nm per second for the un-coherent laser OTDR acquisition. With reference to FIGS. 1A and 1B, a typical 3 dB bandwidth of a pulse laser light, either BBS 27 or tunable laser, spectral bandwidth is about 30 to >50 nm (FWHM).

Reference to in FIGS. 1A and 1B, an un-coherent laser OTDR real-time data acquisition may use a quasi-continuous data sampling technique, e.g., acquiring one group real time OTDR containing K no averaging real-time un-coherent laser OTDR traces as one group data, then such group data acquisition is repeated for number N times with a time lapse.

Figures 7A, 7B, 7C:
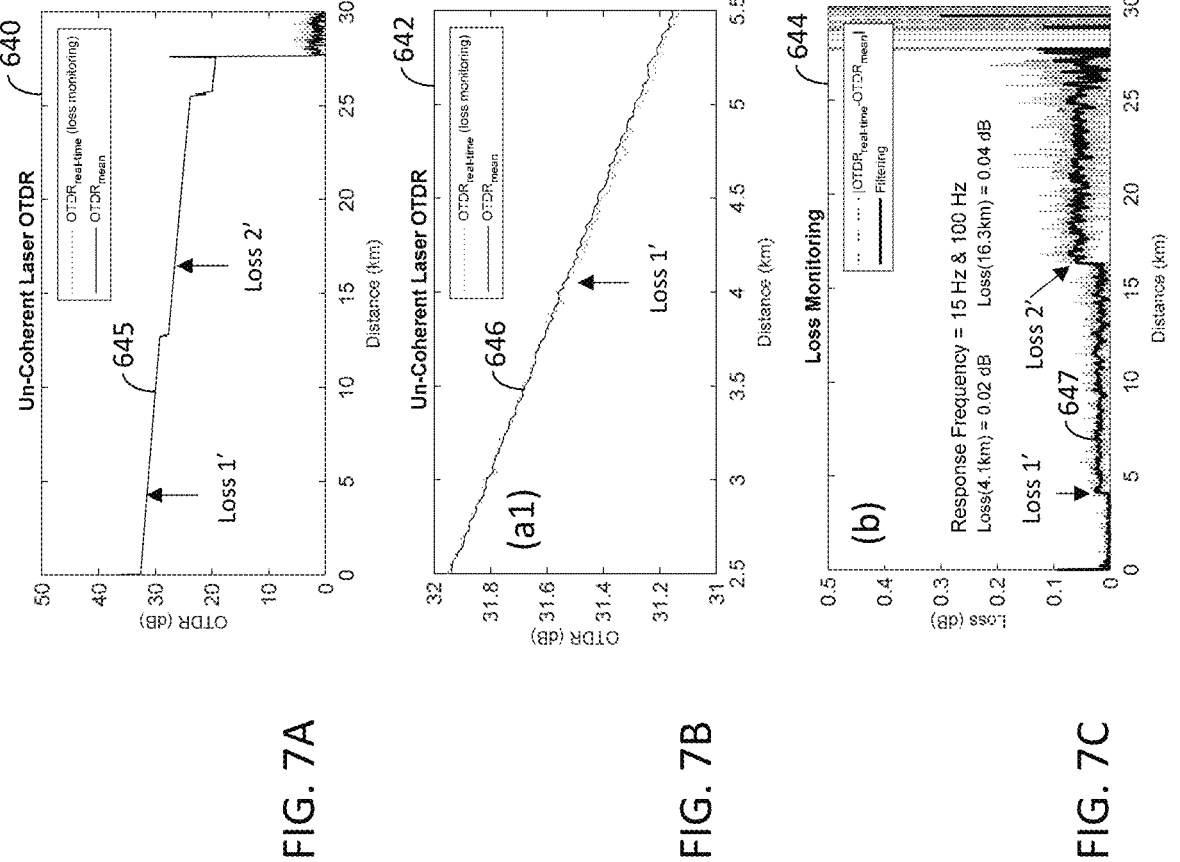
FIG. 7A is a graph showing an exemplary reflectometric traces from an un-coherent laser OTDR form real-time loss monitoring with a response frequency of 15 Hz or 100 Hz and a loss measurement sensitivity of 0.01 dB.
FIG. 7B is a graph zoomed on reflectometric traces of FIG. 7A.
FIG. 7C is a graph showing exemplary extracted fiber loss information from measured un-coherent laser reflectometric traces of FIG. 7A.

As illustrated in FIG. 7A, un-coherent reflectometric traces 645 are acquired from an un-coherent laser OTDR DAS apparatus 200 with two small losses of about 0.02 dB and about 0.04 dB at locations 4.1 km and 16.3 km, respectively. FIG. 7B is zoomed reflectometric traces 645 of FIG. 7A from an un-coherent laser OTDR DAS apparatus 200 with a small loss of about 0.02 dB at location 4.1 km. As illustrated in FIG. 7C, the fiber loss information 647 is observed from measured un-coherent laser reflectometric traces 645 of FIG. 7A for two fiber losses of about 0.02 dB and about 0.04 dB which were detected at optic fiber locations of 4.1 km and 16.3 km, respectively, with loss response frequency up to 100 Hz.

Typically, the un-coherent OTDR and coherent OTDR uses 100 ns light pulses for real-time loss, loss variation, and acoustic or vibration monitoring and measurement, but other embodiments may allow to use much longer OTDR pulse such as from 50 ns to >5 us pulse so as to measure or monitor long optic fiber cables from 10 km to 50 km and even up to >100 km dependent on the light pulse period.

Example of DAS Device Architecture

Figure 8:
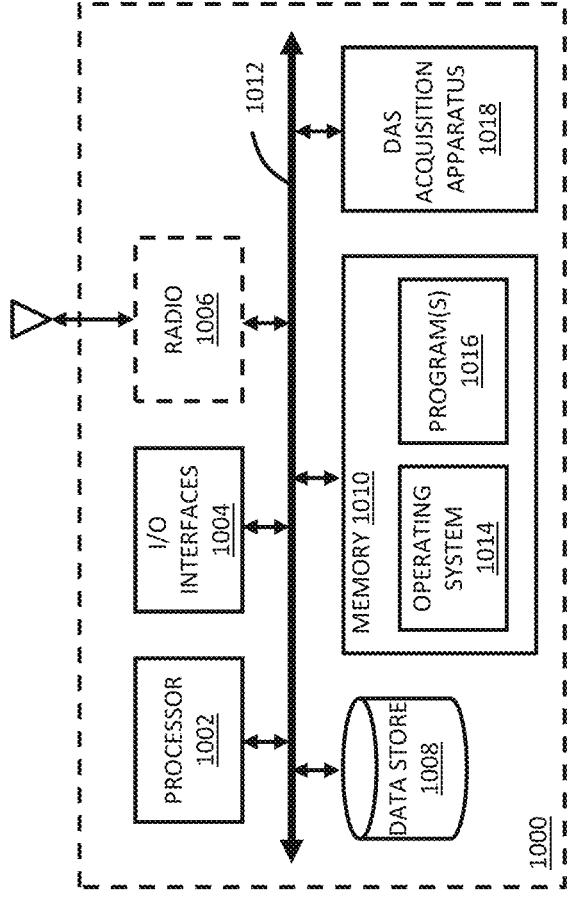
FIG. 8 is a block diagram illustrating an example architecture of a DAS device comprising a DAS acquisition apparatus such as illustrated in FIGS. 1A, 1B and 2, It will be noted that throughout the drawings, like features are identified by like reference numerals. In the following description, similar features in the drawings have been given similar reference numerals and, to not unduly encumber the figures, some elements may not be indicated on some figures if they were already identified in a preceding figure. It should be understood herein that elements of the drawings are not necessarily depicted to scale, since emphasis is placed upon clearly illustrating the elements and structures of the present embodiments. Some mechanical or other physical components may also be omitted in order to not encumber the figures.

FIG. 8 is a block diagram of a DAS device 1000 which may comprise a DAS acquisition apparatus 200 such as illustrated in FIG. 1A, 1B or 2. The DAS device 1000 may comprise a digital device that, in terms of hardware architecture, generally includes a processor 1002, input/output (I/O) interfaces 1004, an optional radio 1006, a data store 1008, a memory 1010, as well as an optical test device including an DAS acquisition device 1018. It should be appreciated by those of ordinary skill in the art that FIG. 8 depicts the DAS device 1000 in a simplified manner, and a practical embodiment may include additional components and suitably configured processing logic to support known or conventional operating features that are not described in detail herein. A local interface 1012 interconnects the major components. The local interface 1012 can be, for example, but not limited to, one or more buses or other wired or wireless connections, as is known in the art. The local interface 1012 can have additional elements, which are omitted for simplicity, such as controllers, buffers (caches), drivers, repeaters, and receivers, among many others, to enable communications. Further, the local interface 1012 may include address, control, and/or data connections to enable appropriate communications among the aforementioned components.

The processor 1002 is a hardware device for executing software instructions. The processor 1002 may comprise one or more processors, including central processing units (CPU), auxiliary processor(s) or generally any device for executing software instructions. When the DAS device 1000 is in operation, the processor 1002 is configured to execute software stored within the memory 1010, to communicate data to and from the memory 1010, and to generally control operations of the DAS device 1000 pursuant to the software instructions. In an embodiment, the processor 1002 may include an optimized mobile processor such as optimized for power consumption and mobile applications. The I/O interfaces 1004 can be used to receive user input from and/or for providing system output. User input can be provided via, for example, a keypad, a touch screen, a scroll ball, a scroll bar, buttons, barcode scanner, and the like. System output can be provided via a display device such as a liquid crystal display (LCD), touch screen, and the like, via one or more LEDs or a set of LEDs, or via one or more buzzer or beepers, etc. The I/O interfaces 1004 can be used to display a graphical user interface (GUI) that enables a user to interact with the DAS device 1000 and/or output at least one of the values derived by the analyzing module.

The radio 1006, if included, may enable wireless communication to an external access device or network. Any number of suitable wireless data communication protocols, techniques, or methodologies can be supported by the radio 1006, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); NarrowBand Internet of Things (NB-IoT); Long Term Evolution Machine Type Communication (LTE-M); magnetic induction; satellite data communication protocols; and any other protocols for wireless communication. The data store 1008 may be used to store data, such as OTDR traces and OTDR measurement data files. The data store 1008 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 1008 may incorporate electronic, magnetic, optical, and/or other types of storage media.

The memory 1010 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 1010 may incorporate electronic, magnetic, optical, and/or other types of storage media. Note that the memory 1010 may have a distributed architecture, where various components are situated remotely from one another, but can be accessed by the processor 1002. The software in memory 1010 can include one or more computer programs, each of which includes an ordered listing of executable instructions for implementing logical functions. In the example of FIG. 8, the software in the memory 1010 includes a suitable operating system (O/S) 1014 and computer program(s) 1016. The operating system 1014 essentially controls the execution of other computer programs and provides scheduling, input-output control, file and data management, memory management, and communication control and related services. The program(s) 1016 may include various applications, add-ons, etc. configured to provide end-user functionality with the DAS device 1000. For example, example programs 1016 may include a web browser to connect with a server for transferring DAS measurement data files, a dedicated DAS application configured to control DAS acquisitions by the DAS acquisition device 1018, set DAS acquisition parameters, analyze DAS traces obtained by the DAS acquisition device 1018 and display a GUI related to the DAS device 1000. For example, the dedicated DAS application may embody an DAS analysis module configured to analyze acquired DAS traces in order to perform acoustic and vibration measurements, and produce DAS measurement data files.

It is noted that, in some embodiments, the I/O interfaces 1004 may be provided via a physically distinct mobile device (not shown), such as a handheld computer, a smartphone, a tablet computer, a laptop computer, a wearable computer or the like, e.g., communicatively coupled to the DAS device 1000 via the radio 106. In such cases, at least some of the programs 1016 may be located in a memory of such a mobile device, for execution by a processor of the physically distinct device. The mobile may then also include a radio and be used to transfer DAS measurement data files toward a remote test application residing, e.g., on a server.

It should be noted that the DAS device shown in FIG. 8 is meant as an illustrative example only. Numerous types of computer systems are available and can be used to implement the DAS device.

The embodiments described above are intended to be exemplary only and one skilled in the art will recognize that numerous modifications can be made to these embodiments without departing from the scope of the invention.

Although the present disclosure has been illustrated and described herein with reference to specific embodiments and examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

The invention claimed is:

1. A method for performing acoustic and vibration measurements based on fiber optic distributed acoustic sensing (DAS), the method comprising:

performing repetitive DAS acquisitions toward an optical fiber link using a DAS acquisition device comprising a coherent Optical Time Domain Reflectometer (OTDR) to provide a group of K DAS traces, wherein each DAS acquisition is performed by propagating in the optical fiber link, a pulsed test signal and detecting corresponding return light from the optical fiber link so as to obtain a DAS trace representing backscattered and reflected light as a function of distance in the optical fiber link;

processing said group of DAS traces to produce a DAS signal associated with said group; and repeating said performing repetitive DAS acquisitions and said processing said group of DAS traces to obtain a plurality of independent groups of DAS traces and a corresponding plurality of DAS signals, such that independent DAS signals are obtained using said independent groups of DAS traces.

2. The method as claimed in claim 1, wherein said DAS acquisition device comprises multiple DAS acquisition channels, said DAS acquisition channels sharing a single coherent light source and wherein said method comprises performing DAS acquisitions toward multiple channels each connected to an optical fiber link.

3. The method as claimed in claim 1, wherein processing said group of DAS traces comprises:

for each independent group of DAS traces $P_{(n,k)}(z)$, calculating a Root Mean Square (RMS) difference as a function of a distance z along the optical fiber link, to obtain a corresponding DAS signal $\sqrt{\langle \Delta P_{(n,k)}(z)^2 \rangle}_K$, wherein n represents the data group index (n=1 to N) and k represents the DAS trace index within one group (k=1 to K).

4. The method as claimed in claim 1, wherein a time lapse $\Delta T$ is left in-between groups of DAS acquisitions to prevent memory saturation and allow time for processing said group of DAS traces before DAS acquisitions of the next group.

5. The method as claimed in claim 4, wherein no test signal is propagated in said optical fiber link during said time lapse $\Delta T$.

6. The method as claimed in claim 4, wherein DAS acquisitions performed during said time lapse $\Delta T$ are discarded.

7. A fiber optic distributed acoustic sensing (DAS) system for performing acoustic and vibration measurements, the DAS system comprising:

a DAS acquisition device connectable toward an optical fiber link and comprising a coherent Optical Time Domain Reflectometer (OTDR) for performing repetitive DAS acquisitions, wherein each DAS acquisition is performed by propagating in the optical fiber link, a pulsed test signal and detecting corresponding return light from the optical fiber link so as to obtain a DAS trace representing backscattered and reflected light as a function of distance in the optical fiber link, wherein DAS traces are acquired in groups to provide a plurality of groups of K DAS traces;

a memory to store said groups of DAS traces, at least one group of DAS traces at a time; and a processing unit receiving and independently processing each group of DAS traces to produce corresponding DAS signals, such that independent DAS signals are obtained using independent groups of DAS traces feast e-DAS-acquisition device.

8. The DAS system as claimed in claim 7, wherein said DAS acquisition device comprises multiple DAS acquisition channels for performing DAS acquisitions toward multiple channels each connected to an optical fiber link, wherein said DAS acquisition channels share a single coherent light source.

9. The DAS system as claimed in claim 7, wherein said DAS acquisition device has a coherent OTDR mode of operation for performing acoustic and vibration measurements and an un-coherent OTDR mode of operation for performing optical fiber loss measurement.

10. The DAS system as claimed in claim 9, wherein said DAS acquisition device comprises:

a light generating assembly to be coupled to the optical fiber link for generating and propagating in the optical fiber link a test light signal comprising test light pulses, the light generating assembly comprising:

a coherent light source to produce continuous wave coherent light;

a semiconductor optical amplifier receiving light from said coherent light source;

a pulse generator connected to the semiconductor optical amplifier to drive it to generate said test light pulses; and a detection module for detecting corresponding return light from the optical fiber link so as to acquire a reflectometric trace representing backscattered and reflected light as a function of distance along the optical fiber link;

wherein in the coherent OTDR mode of operation, said coherent light source is turned on so that said light generating assembly produces a coherent pulsed test light signal, so as to acquire DAS traces for acoustic and vibration measurement; and wherein in the un-coherent OTDR mode of operation, said coherent light source is turned off so that said light generating assembly produces an un-coherent pulsed test light signal, so as to acquire un-coherent reflectometric traces for optical fiber loss measurement.

11. The DAS system as claimed in claim 7, wherein the DAS acquisition device comprises a controller configured to leave a time lapse $\Delta T$ in-between groups of DAS acquisitions to prevent memory saturation and allow time for processing each group of DAS traces before DAS acquisitions of the next group.

12. The DAS system as claimed in claim 11, wherein said controller is configured to drive said DAS acquisition device to not propagate said pulsed test signal in said optical fiber link during said time lapse $\Delta T$.

13. The DAS system as claimed in claim 11, wherein said controller is configured to drive said DAS acquisition device to perform DAS acquisitions during said time lapse $\Delta T$ but discard them.

* * * * *